US010404729B2

(12) United States Patent
Turgeman

(10) Patent No.: US 10,404,729 B2
(45) Date of Patent: *Sep. 3, 2019

(54) DEVICE, METHOD, AND SYSTEM OF GENERATING FRAUD-ALERTS FOR CYBER-ATTACKS

(71) Applicant: BioCatch Ltd., Tel Aviv (IL)

(72) Inventor: Avi Turgeman, Cambridge, MA (US)

(73) Assignee: BIOCATCH LTD., Tel Aviv (IL)

( * ) Notice: Subject to any disclaimer, the term of this patent is extended or adjusted under 35 U.S.C. 154(b) by 246 days.

This patent is subject to a terminal disclaimer.

(21) Appl. No.: 15/369,106

(22) Filed: Dec. 5, 2016

(65) Prior Publication Data

US 2017/0085587 A1 Mar. 23, 2017

Related U.S. Application Data

(63) Continuation-in-part of application No. 14/675,765, filed on Apr. 1, 2015, now Pat. No. 9,552,470, which
(Continued)

(51) Int. Cl.
*H04L 29/06* (2006.01)
*G06F 3/0354* (2013.01)
(Continued)

(52) U.S. Cl.
CPC ...... *H04L 63/1425* (2013.01); *G06F 3/03543* (2013.01); *G06F 3/03547* (2013.01);
(Continued)

(58) Field of Classification Search
CPC ... H04L 67/22; G06F 11/3438; G06F 11/3476
See application file for complete search history.

(56) References Cited

U.S. PATENT DOCUMENTS 3,618,019 A 11/1971 Nemirovsky et al.
3,699,517 A 10/1972 Dyche
(Continued)

FOREIGN PATENT DOCUMENTS

EP 2410450 1/2012
EP 2477136 7/2012
(Continued)

OTHER PUBLICATIONS

Ahmed et al., "A New Biometric Technology Based on Mouse Dynamics", Jul.-Sep. 2007, IEEE Transactions on Dependable and Secure Computing, vol. 4, No. 3, pp. 165-179.
(Continued)

*Primary Examiner* — Jason K Gee
(74) *Attorney, Agent, or Firm* — Eitan Mehulal Sadot

(57) ABSTRACT

Devices, systems, and methods of detecting user identity, differentiating between users of a computerized service, and detecting a cyber-attacker. An end-user device (a desktop computer, a laptop computer, a smartphone, a tablet, or the like) interacts and communicates with a server of a computerized server (a banking website, an electronic commerce website, or the like). The interactions are monitored, tracked and logged. User Interface (UI) interferences are intentionally introduced to the communication session; and the server tracks the response or the reaction of the end-user to such communication interferences. The system determines whether the user is a legitimate human user; or a cyber-attacker posing as the legitimate human user. The system displays gauges indicating cyber fraud scores or cyber-attack threat-levels. The system extrapolates from observed fraud incidents and utilizes a rules engine to automatically search for similar fraud events and to automatically detect fraud events or cyber-attackers.

11 Claims, 8 Drawing Sheets

Related U.S. Application Data is a continuation-in-part of application No. 14/566,723, filed on Dec. 11, 2014, now Pat. No. 9,071,969, which is a continuation of application No. 13/922,271, filed on Jun. 20, 2013, now Pat. No. 8,938,787, which is a continuation-in-part of application No. 13/877,676, filed as application No. PCT/IL2011/000907 on Nov. 29, 2011, now Pat. No. 9,069,942, said application No. 14/675,765 is a continuation-in-part of application No. 14/320,653, filed on Jul. 1, 2014, now Pat. No. 9,275,337, and a continuation-in-part of application No. 14/320,656, filed on Jul. 1, 2014, now Pat. No. 9,665,703, and a continuation-in-part of application No. 14/325,393, filed on Jul. 8, 2014, now Pat. No. 9,531,733, and a continuation-in-part of application No. 14/325,394, filed on Jul. 8, 2014, now Pat. No. 9,547,766, and a continuation-in-part of application No. 14/325,395, filed on Jul. 8, 2014, now Pat. No. 9,621,567, and a continuation-in-part of application No. 14/325,396, filed on Jul. 8, 2014, now abandoned, and a continuation-in-part of application No. 14/325,397, filed on Jul. 8, 2014, now Pat. No. 9,450,971, and a continuation-in-part of application No. 14/325,398, filed on Jul. 8, 2014, now Pat. No. 9,477,826.

(60) Provisional application No. 61/973,855, filed on Apr. 2, 2014, provisional application No. 61/417,479, filed on Nov. 29, 2010, provisional application No. 61/843,915, filed on Jul. 9, 2013.

(51) Int. Cl.
| | | |
|---|---|---|
| G06F 3/0489 | (2013.01) | |
| G06F 3/0488 | (2013.01) | |
| G06F 3/041 | (2006.01) | |
| G06F 21/31 | (2013.01) | |
| G06F 21/32 | (2013.01) | |
| G06F 21/55 | (2013.01) | |

(52) U.S. Cl.
CPC ............ *G06F 3/041* (2013.01); *G06F 3/0488* (2013.01); *G06F 3/0489* (2013.01); *G06F 21/31* (2013.01); *G06F 21/316* (2013.01); *G06F 21/32* (2013.01); *G06F 21/554* (2013.01); *H04L 63/08* (2013.01); *H04L 63/1408* (2013.01); *G06F 2221/2133* (2013.01)

(56) References Cited

U.S. PATENT DOCUMENTS

| | | | |
|---|---|---|---|
| 3,983,535 A | 9/1976 | Herbst et al. | |
| 4,128,829 A | 12/1978 | Herbst et al. | |
| 4,621,334 A | 11/1986 | Garcia | |
| 4,760,386 A | 7/1988 | Heath et al. | |
| 4,805,222 A | 2/1989 | Young et al. | |
| 5,442,342 A | 8/1995 | Kung | |
| 5,485,171 A | 1/1996 | Copper et al. | |
| 5,557,686 A | 9/1996 | Brown et al. | |
| 5,565,657 A | 10/1996 | Merz | |
| 5,838,306 A | 11/1998 | O'Connor et al. | |
| 5,874,941 A | 2/1999 | Yamada | |
| 5,999,162 A | 12/1999 | Takahashi | |
| 6,337,686 B2 | 1/2002 | Wong et al. | |
| 6,337,919 B1 | 1/2002 | Dunton | |
| 6,442,692 B1 | 8/2002 | Zilberman | |
| 6,572,014 B1 | 6/2003 | Lambert | |
| 6,819,219 B1 | 11/2004 | Bolle | |
| 6,836,554 B2 | 12/2004 | Bolle | |
| 6,895,514 B1 | 5/2005 | Kermani | |
| 6,938,061 B1 | 8/2005 | Rumynin et al. | |
| 6,938,159 B1 | 8/2005 | O'Connor et al. | |
| 6,957,185 B1 | 10/2005 | Labaton | |
| 6,957,186 B1 | 10/2005 | Guheen et al. | |
| 6,983,061 B2 | 1/2006 | Ikegami et al. | |
| 7,092,926 B2 | 8/2006 | Cerrato | |
| 7,130,452 B2 | 10/2006 | Bolle et al. | |
| 7,133,792 B2 | 11/2006 | Murakami et al. | |
| 7,139,916 B2 | 11/2006 | Billingsley et al. | |
| 7,158,118 B2 | 1/2007 | Liberty | |
| 7,236,156 B2 | 6/2007 | Liberty | |
| 7,245,218 B2 | 7/2007 | Ikehara et al. | |
| 7,494,061 B2 | 2/2009 | Reinhold | |
| 7,523,191 B1 | 4/2009 | Thomas et al. | |
| 7,535,456 B2 | 5/2009 | Liberty | |
| 7,606,915 B1 | 10/2009 | Calinov et al. | |
| 7,796,013 B2 | 9/2010 | Murakami et al. | |
| 7,818,290 B2 | 10/2010 | Davis et al. | |
| 7,860,870 B2 | 12/2010 | Sadagopan | |
| 8,031,175 B2 | 10/2011 | Rigazio | |
| 8,065,624 B1 | 11/2011 | Morin | |
| 8,125,312 B2 | 2/2012 | Orr | |
| 8,156,324 B1 | 4/2012 | Shnowske | |
| 8,201,222 B2 | 6/2012 | Inoue | |
| 8,417,960 B2 | 4/2013 | Takahashi et al. | |
| 8,433,785 B2 | 4/2013 | Awadallah et al. | |
| 8,449,393 B2 | 5/2013 | Sobel | |
| 8,499,245 B1 | 7/2013 | Froment | |
| 8,510,113 B1 | 8/2013 | Conkie et al. | |
| 8,548,208 B2 | 10/2013 | Schultz | |
| 8,555,077 B2 | 10/2013 | Davis | |
| 8,745,729 B2 | 6/2014 | Roluri | |
| 8,832,823 B2 | 6/2014 | Boss | |
| 8,788,838 B1 | 7/2014 | Fadell | |
| 8,803,797 B2 | 8/2014 | Scott | |
| 8,819,812 B1 | 8/2014 | Weber | |
| 8,838,060 B2 | 9/2014 | Walley | |
| 8,941,466 B2 | 1/2015 | Bayram | |
| 9,154,534 B1 | 10/2015 | Gayles et al. | |
| 9,174,123 B2 | 11/2015 | Nasiri et al. | |
| 9,195,351 B1 | 11/2015 | Rosenberg | |
| 9,282,112 B2 | 3/2016 | Filatov | |
| 9,301,140 B1 | 3/2016 | Costigan et al. | |
| 9,304,915 B2 | 4/2016 | Adams et al. | |
| 9,529,987 B2 | 12/2016 | Deutschmann | |
| 9,589,120 B2 | 3/2017 | Samuel | |
| 2001/0004733 A1 | 6/2001 | Eldering | |
| 2002/0023229 A1 | 2/2002 | Hangai | |
| 2002/0089412 A1 | 7/2002 | Heger et al. | |
| 2003/0033526 A1 | 2/2003 | French et al. | |
| 2003/0074201 A1 | 4/2003 | Grashey et al. | |
| 2003/0137494 A1 | 7/2003 | Tulbert | |
| 2003/0212811 A1 | 11/2003 | Thornton | |
| 2004/0015714 A1 | 1/2004 | Abraham et al. | |
| 2004/0017355 A1 | 1/2004 | Shim | |
| 2004/0021643 A1 | 2/2004 | Hoshino | |
| 2004/0034784 A1 | 2/2004 | Fedronic | |
| 2004/0062423 A1 | 4/2004 | Doi | |
| 2004/0111523 A1 | 6/2004 | Hall et al. | |
| 2004/0123156 A1 | 6/2004 | Hammond | |
| 2004/0143737 A1 | 7/2004 | Teicher | |
| 2004/0221171 A1 | 11/2004 | Ahmed | |
| 2005/0008148 A1 | 1/2005 | Jacobson | |
| 2005/0179657 A1 | 8/2005 | Russo et al. | |
| 2005/0289264 A1 | 12/2005 | Illowsky et al. | |
| 2006/0006803 A1 | 1/2006 | Huang et al. | |
| 2006/0080263 A1 | 4/2006 | Willis | |
| 2006/0090073 A1 | 4/2006 | Steinberg | |
| 2006/0123101 A1 | 6/2006 | Buccella | |
| 2006/0143454 A1 | 6/2006 | Walmsley | |
| 2006/0195328 A1 | 8/2006 | Abraham et al. | |
| 2006/0215886 A1 | 9/2006 | Black | |
| 2006/0224898 A1* | 10/2006 | Ahmed | G06F 21/316 |
| | | | 713/186 |
| 2006/0282660 A1 | 12/2006 | Varghese et al. | |
| 2006/0284969 A1 | 12/2006 | Kim et al. | |
| 2007/0156443 A1 | 7/2007 | Gurvey | |
| 2007/0174082 A1 | 7/2007 | Singh | |
| 2007/0183633 A1 | 8/2007 | Hoffmann | |

(56) References Cited

U.S. PATENT DOCUMENTS

| | | |
|---|---|---|
| 2007/0214426 A1 | 9/2007 | Ruelle et al. |
| 2007/0236330 A1 | 10/2007 | Cho |
| 2007/0240230 A1 | 10/2007 | O'Connell |
| 2007/0250920 A1 | 10/2007 | Lindsay |
| 2007/0255818 A1* | 11/2007 | Tanzer .............. G06F 21/552 709/224 |
| 2007/0255821 A1 | 11/2007 | Ge et al. |
| 2007/0266305 A1 | 11/2007 | Cong et al. |
| 2007/0271466 A1 | 11/2007 | Mak et al. |
| 2007/0283416 A1 | 12/2007 | Renaud |
| 2008/0046982 A1 | 2/2008 | Parkinson |
| 2008/0068343 A1 | 3/2008 | Hoshino |
| 2008/0084972 A1 | 4/2008 | Burke |
| 2008/0091639 A1 | 4/2008 | Davis et al. |
| 2008/0092209 A1 | 4/2008 | Davis et al. |
| 2008/0092245 A1 | 4/2008 | Alward |
| 2008/0097851 A1 | 4/2008 | Bemmel |
| 2008/0098456 A1 | 4/2008 | Alward |
| 2008/0120717 A1 | 5/2008 | Shakkarwar |
| 2008/0136790 A1 | 6/2008 | Akimitsu |
| 2008/0162449 A1 | 7/2008 | Chao-Yu et al. |
| 2008/0183745 A1 | 7/2008 | Cancel et al. |
| 2008/0192005 A1 | 8/2008 | Elgoyhen |
| 2008/0200310 A1 | 8/2008 | Tagliabue |
| 2008/0211766 A1 | 9/2008 | Westerman et al. |
| 2008/0215576 A1 | 9/2008 | Zhao et al. |
| 2008/0263636 A1 | 10/2008 | Gusler |
| 2008/0298588 A1 | 12/2008 | Shakkarwar |
| 2008/0301808 A1 | 12/2008 | Calo et al. |
| 2009/0037983 A1 | 2/2009 | Chiruvolu |
| 2009/0038010 A1 | 2/2009 | Ma |
| 2009/0089879 A1 | 4/2009 | Wang et al. |
| 2009/0094311 A1 | 4/2009 | Awadallah et al. |
| 2009/0132395 A1 | 5/2009 | Lam |
| 2009/0157792 A1 | 6/2009 | Flatali |
| 2009/0189736 A1 | 7/2009 | Hayashi |
| 2009/0199296 A1 | 8/2009 | Xie et al. |
| 2009/0227232 A1 | 9/2009 | Matas |
| 2009/0241188 A1 | 9/2009 | Komura |
| 2009/0254336 A1 | 10/2009 | Dumais et al. |
| 2009/0281979 A1 | 11/2009 | Tysowski |
| 2009/0293119 A1 | 11/2009 | Jonsson |
| 2009/0320123 A1 | 12/2009 | Yu et al. |
| 2010/0007632 A1 | 1/2010 | Yamazaki |
| 2010/0040293 A1 | 2/2010 | Hermann |
| 2010/0042403 A1 | 2/2010 | Chandrasekar et al. |
| 2010/0046806 A1 | 2/2010 | Baughman et al. |
| 2010/0070405 A1 | 3/2010 | Joa |
| 2010/0077470 A1 | 3/2010 | Kozat et al. |
| 2010/0082747 A1 | 4/2010 | Yue et al. |
| 2010/0082998 A1 | 4/2010 | Kohavi |
| 2010/0115610 A1 | 5/2010 | Tredoux |
| 2010/0122082 A1 | 5/2010 | Deng et al. |
| 2010/0125816 A1 | 5/2010 | Bezos |
| 2010/0138370 A1 | 6/2010 | Wu |
| 2010/0164897 A1 | 7/2010 | Morin |
| 2010/0171753 A1 | 7/2010 | Kwon |
| 2010/0197352 A1 | 8/2010 | Runstedler |
| 2010/0269165 A1 | 10/2010 | Chen |
| 2010/0281539 A1 | 11/2010 | Burns et al. |
| 2010/0287229 A1 | 11/2010 | Hauser |
| 2010/0299292 A1* | 11/2010 | Collazo .............. G06F 21/577 706/14 |
| 2010/0321304 A1 | 12/2010 | Rofougaran |
| 2010/0328074 A1 | 12/2010 | Johnson et al. |
| 2011/0010209 A1 | 1/2011 | McNally |
| 2011/0012829 A1 | 1/2011 | Yao |
| 2011/0016320 A1 | 1/2011 | Bergsten et al. |
| 2011/0016534 A1 | 1/2011 | Jakobsson |
| 2011/0018828 A1 | 1/2011 | Wu |
| 2011/0023115 A1 | 1/2011 | Wright |
| 2011/0029902 A1 | 2/2011 | Bailey |
| 2011/0039602 A1 | 2/2011 | McNamara |
| 2011/0043475 A1 | 2/2011 | Rigazio |
| 2011/0050394 A1 | 3/2011 | Zhang |
| 2011/0063211 A1 | 3/2011 | Hoerl et al. |
| 2011/0065504 A1 | 3/2011 | Dugan et al. |
| 2011/0102570 A1 | 5/2011 | Wilf et al. |
| 2011/0105859 A1 | 5/2011 | Popovic |
| 2011/0113388 A1 | 5/2011 | Eisen et al. |
| 2011/0154273 A1 | 6/2011 | Aburada et al. |
| 2011/0159650 A1 | 6/2011 | Shiraishi |
| 2011/0159850 A1 | 6/2011 | Faith |
| 2011/0162076 A1 | 6/2011 | Song et al. |
| 2011/0191820 A1 | 8/2011 | Ivey |
| 2011/0193737 A1 | 8/2011 | Chiueh |
| 2011/0202453 A1 | 8/2011 | Issa et al. |
| 2011/0221684 A1 | 9/2011 | Rydenhag |
| 2011/0223888 A1 | 9/2011 | Esaki |
| 2011/0225644 A1 | 9/2011 | Pullikottil |
| 2011/0246902 A1 | 10/2011 | Tsai et al. |
| 2011/0248941 A1 | 10/2011 | Abdo |
| 2011/0251823 A1* | 10/2011 | Davis .............. G06Q 30/02 702/181 |
| 2011/0271342 A1 | 11/2011 | Chung et al. |
| 2011/0276414 A1 | 11/2011 | Subbarao et al. |
| 2011/0304531 A1 | 12/2011 | Brooks |
| 2011/0320822 A1 | 12/2011 | Lind |
| 2012/0005483 A1 | 1/2012 | Patvarczki et al. |
| 2012/0005719 A1 | 1/2012 | McDougal |
| 2012/0007821 A1 | 1/2012 | Zaliva |
| 2012/0054834 A1 | 3/2012 | King |
| 2012/0096555 A1 | 4/2012 | Mahaffey |
| 2012/0102551 A1 | 4/2012 | Bidare |
| 2012/0113061 A1 | 5/2012 | Ikeda |
| 2012/0124662 A1 | 5/2012 | Baca |
| 2012/0133055 A1 | 5/2012 | Machida |
| 2012/0154173 A1 | 6/2012 | Chang et al. |
| 2012/0154273 A1 | 6/2012 | Mcdade et al. |
| 2012/0154823 A1 | 6/2012 | Sakamoto |
| 2012/0159599 A1 | 6/2012 | Szoke |
| 2012/0164978 A1 | 6/2012 | Conti |
| 2012/0167170 A1 | 6/2012 | Shi |
| 2012/0174213 A1 | 7/2012 | Geiger |
| 2012/0188198 A1 | 7/2012 | Jeong |
| 2012/0204257 A1 | 8/2012 | O'Connell |
| 2012/0218193 A1 | 8/2012 | Weber et al. |
| 2012/0246737 A1 | 9/2012 | Paxton |
| 2012/0252410 A1 | 10/2012 | Williams |
| 2012/0278804 A1 | 11/2012 | Narayanasamy et al. |
| 2012/0284380 A1 | 11/2012 | Anderson |
| 2013/0024239 A1 | 1/2013 | Baker |
| 2013/0036416 A1 | 2/2013 | Raju et al. |
| 2013/0076650 A1 | 3/2013 | Vik |
| 2013/0088434 A1 | 4/2013 | Masuda |
| 2013/0097682 A1 | 4/2013 | Zeljkovic et al. |
| 2013/0097706 A1 | 4/2013 | Titonis et al. |
| 2013/0111586 A1 | 5/2013 | Jackson |
| 2013/0133055 A1 | 5/2013 | Ali et al. |
| 2013/0135218 A1 | 5/2013 | Jain |
| 2013/0139248 A1 | 5/2013 | Rhee |
| 2013/0154999 A1 | 6/2013 | Guard |
| 2013/0162603 A1 | 6/2013 | Peng |
| 2013/0167212 A1 | 6/2013 | Azar et al. |
| 2013/0212674 A1 | 8/2013 | Boger |
| 2013/0239195 A1 | 9/2013 | Turgeman |
| 2013/0239206 A1 | 9/2013 | Draluk |
| 2013/0282637 A1 | 10/2013 | Costigan |
| 2013/0305357 A1* | 11/2013 | Ayyagari .............. H04W 12/06 726/22 |
| 2013/0312097 A1 | 11/2013 | Turnbull |
| 2013/0335349 A1 | 12/2013 | Ferren |
| 2014/0033317 A1 | 1/2014 | Barber |
| 2014/0041020 A1 | 2/2014 | Zhao |
| 2014/0078061 A1 | 3/2014 | Simons et al. |
| 2014/0078193 A1 | 3/2014 | Barnhoefer et al. |
| 2014/0082369 A1 | 3/2014 | Waclawsky et al. |
| 2014/0111451 A1 | 4/2014 | Park |
| 2014/0118520 A1 | 5/2014 | Slaby |
| 2014/0143304 A1 | 5/2014 | Hegarty et al. |
| 2014/0196119 A1 | 7/2014 | Hill et al. |
| 2014/0200953 A1 | 7/2014 | Mun |
| 2014/0250538 A1 | 9/2014 | Rapaport et al. |
| 2014/0259130 A1 | 9/2014 | Li et al. |

(56) References Cited

U.S. PATENT DOCUMENTS

| | | |
|---|---|---|
| 2014/0283059 A1 | 9/2014 | Sambamurthy et al. |
| 2014/0317734 A1 | 10/2014 | Valencia et al. |
| 2014/0337786 A1 | 11/2014 | Luo |
| 2014/0344927 A1 | 11/2014 | Turgeman et al. |
| 2015/0002479 A1 | 1/2015 | Kawamura |
| 2015/0012920 A1 | 1/2015 | De Santis et al. |
| 2015/0062078 A1 | 3/2015 | Christman |
| 2015/0091858 A1 | 4/2015 | Rosenberg |
| 2015/0101031 A1 | 4/2015 | Harjanto et al. |
| 2015/0146945 A1 | 5/2015 | Han |
| 2015/0213244 A1 | 7/2015 | Lymberopoulos |
| 2015/0268768 A1 | 9/2015 | Woodhull |
| 2016/0006800 A1 | 1/2016 | Summers et al. |
| 2016/0034673 A1 | 2/2016 | Chandra |
| 2016/0042164 A1 | 2/2016 | Goldsmith et al. |
| 2016/0077620 A1 | 3/2016 | Choi |
| 2016/0164905 A1 | 6/2016 | Pinney Wood et al. |
| 2016/0164906 A1 | 6/2016 | Pinney Wood et al. |
| 2016/0174044 A1 | 6/2016 | Jones |
| 2016/0179245 A1 | 6/2016 | Johansson |
| 2016/0191237 A1 | 6/2016 | Roth |
| 2016/0196414 A1 | 7/2016 | Stuntebeck |
| 2016/0209948 A1 | 7/2016 | Tulbert |
| 2016/0226865 A1 | 8/2016 | Chen |
| 2016/0342826 A1 | 11/2016 | Apostolos |
| 2016/0364138 A1 | 12/2016 | Lou |
| 2017/0034210 A1 | 2/2017 | Talmor |
| 2017/0048272 A1 | 2/2017 | Yamamura et al. |
| 2017/0090418 A1 | 3/2017 | Tsang |
| 2017/0149958 A1 | 5/2017 | Kian |
| 2017/0193526 A1 | 7/2017 | Turgeman |
| 2017/0195354 A1 | 7/2017 | Kesin |
| 2017/0364919 A1 | 12/2017 | Ranganath |
| 2018/0012227 A1 | 1/2018 | Tunnell |
| 2018/0103047 A1 | 4/2018 | Turgeman |
| 2018/0107836 A1 | 4/2018 | Boger |
| 2018/0115899 A1 | 4/2018 | Kedem |
| 2018/0121640 A1 | 5/2018 | Turgeman |

FOREIGN PATENT DOCUMENTS

| | | |
|---|---|---|
| EP | 2610776 | 7/2013 |
| ES | 338092 | 5/2010 |
| WO | 2007146437 | 12/2007 |
| WO | 2012073233 | 6/2012 |

OTHER PUBLICATIONS

Bailey, Kyle O., "Computer Based Behavioral Biometric Authentication via Multi-Modal Fusion", Thesis, 2013, Air Force Insitute of Technology.

Stinson et al., "Characterizing Bots' Remote Control Behavior". Detection of Intrusions and Malware, and Vulnerability Assessment. Springer Berlin Heidelberg, p. 89-108. Dec. 31, 2007.

Todorov, "Optimality Principles in Sensorimotor Control (Review)", Sep. 2004, Nature Neuroscience 7, pp. 907-915.

Cleeff et al., "Security Implications of Virtualization: A Literature Study", Science and Engineering, 2009.

Hibbeln et al., "Detecting Deception in Online Environments: Measuring Fraud Through Mouse Cursor Movements", Jun. 7, 2014, Gmunden Retreat on NeuroIS 2014 Gmunden Austria, p. 38.

Ferrie Peter, "Attack on Virtual Machine Emulators", Symantec Technology Exchange, 2007.

Yampolskiy et al., "Behavioural Biometrics: a survey and classification", 2008, International Journal of Biometrics, vol. 1, No. 1, pp. 81-113.

Provos et al., 2007, "The Ghost in the Browser: Analysis of Web-based Malware".

Huang Yao-Wen et al., "Web application security assessment by fault injection and behavior monitoring", 2003, Proceedings of the 12th international conference on World Wide Web, ACM.

Emmanouil Vasilomanolakis, "A honeypot-driven cyber incident monitor: Lessons learned and steps ahead"; Sep. 2015; SIN '15: Proceedings of the 8th International Conference on Security of Information and Networks; Publisher: ACM; pp. 1-7.

Franklin et al., "Remote Detection of Virtual Machine Monitors with Fuzzy benchmarking", ACM SIGOPS Operating Systems Review, V42, Issue 3, Apr. 2008.

Georgia Frantzeskou et al., "Identifying Authorship by Byte-Level N-Grams: The source Code Author Profile (SCAP) Method", Spring 2007, International Journal of Digital Evidence, vol. 6, issue 1.

Liston et al., "On the Cutting Edge: Thwarting Virtual Machine Detection"; retrieved from the Internet on May 3, 2017, from: http://docplayer.net/9791309-On-the-cutting-edge-thwarting-virtual-machine-detection.html.

Zheng et al., "An Efficient User Verification System via Mouse Movements", Oct. 17-21, 2011, CCS' 11, Chicago, Illinois.

Tavis Ormandy, "An Empirical Study into the Security Exposure to Hosts of Hostile Virtualized Environments", retrieved from the Internet on May 3, 2017, from: http://taviso.decsystem.org/virtsec.pdf.

Spafford et al., "Software Forensics: Can We Track Code to its Authors?", Feb. 1992, Computer Science Technical Report, Purdue e-Pubs, Report No. CSD-TR-92-010.

Garfinkel and Rosenblum, "A virtual Machine Introspection-Based Architecture for Intrusion Detection.", 2003, Proc. Network and Distributed Systems Security Symp., The Internet Society, pp. 191-206.

Nance et al., "Virtual Machine Introspection", IEEE Security & Privacy, 2008.

Nakkabi et al., "Improving Mouse Dynamics Biometric Performance Using Variance Reduction via Extractors with Separate Features", Nov. 2010, IEEE Transactions on System, Man, and Cybernetics; vol. 40, No. 6.

International Search Report for application PCT/IL2011/000907 dated Apr. 19, 2012.

International Search Report for application PCT/IB2014/062293 dated Oct. 1, 2014.

International Search Report for application PCT/IB2014/062941 dated Dec. 17, 2014.

International Search Report for application PCT/IB2016/054064 dated Nov. 21, 2016.

Faisal Alkhateeb et al., "Bank Web Sites Phishing Detection and Notification System Based on Semantic Web technologies", International Journal of Security and its Applications 6(4):53-66, Oct. 2012.

Sungzoon Cho et al., "Artificial Rhythms and Cues for Keystroke Dynamics Based Authentication", International Conference on Biometrics (ICB)—Advances in Biometrics, pp. 626-632, year 2006.

International Search Report for PCT/IB2017/055995, dated Feb. 15, 2018.

Written Opinion of the International Search Authority for PCT/IB2017/055995, dated Feb. 15, 2018.

\* cited by examiner

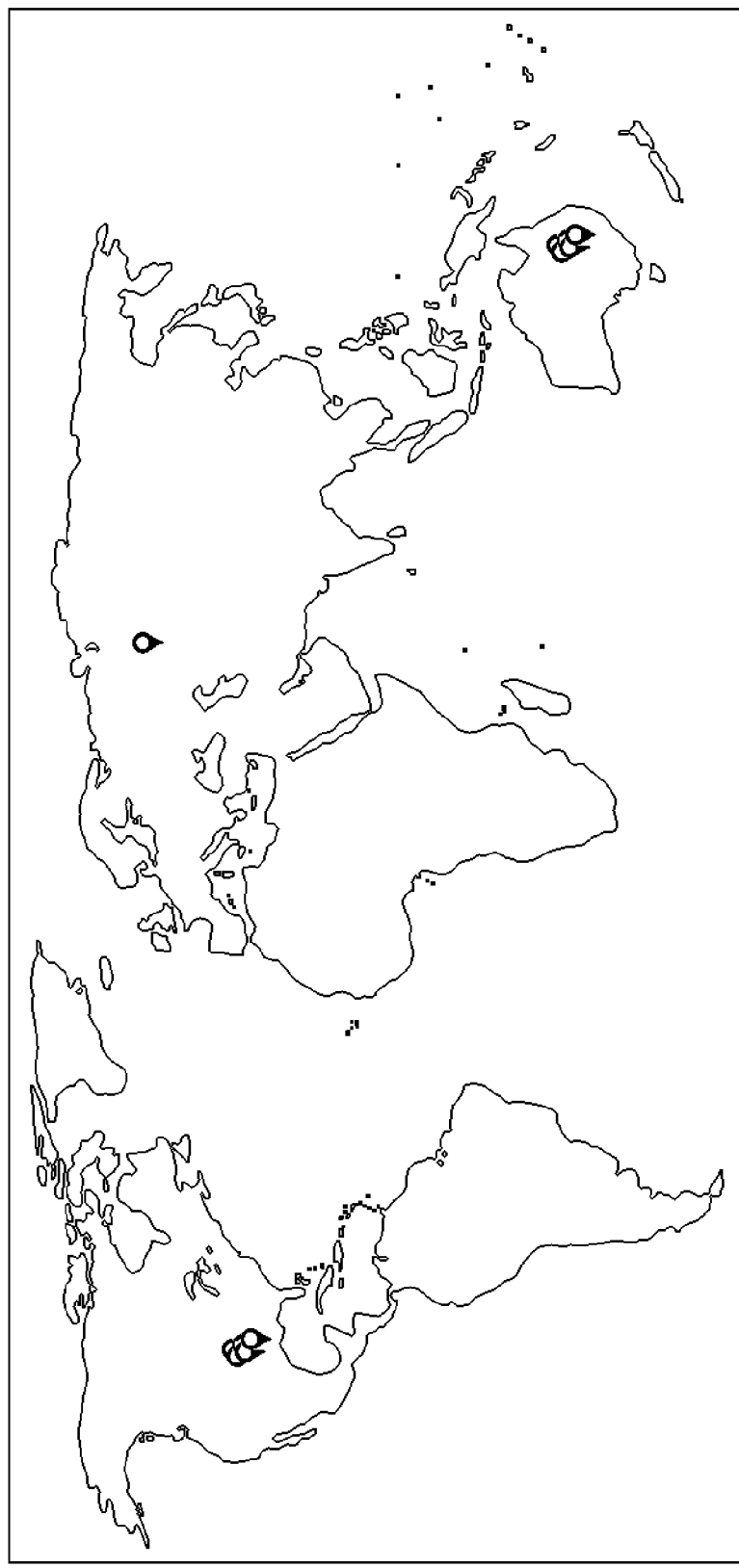

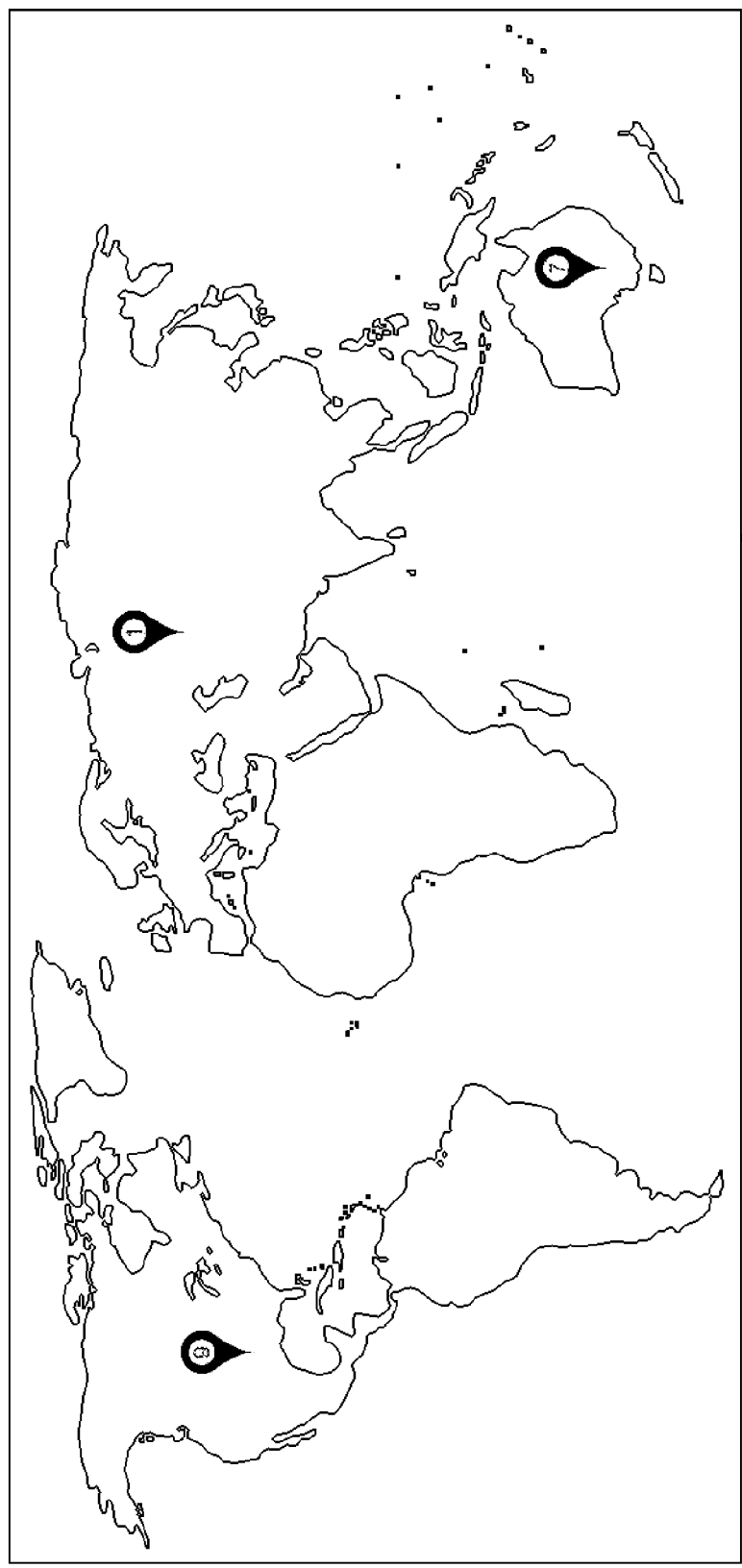

DEVICE, METHOD, AND SYSTEM OF GENERATING FRAUD-ALERTS FOR CYBER-ATTACKS

CROSS-REFERENCE TO RELATED APPLICATIONS

This patent application is a Continuation-in-Part (CIP) of U.S. patent application Ser. No. 14/675,765, filed on Apr. 1, 2015, which is hereby incorporated by reference in its entirety.

The above-mentioned U.S. patent application Ser. No. 14/675,765 claims priority and benefit from U.S. provisional patent application No. 61/973,855, filed on Apr. 2, 2014, which is hereby incorporated by reference in its entirety.

The above-mentioned U.S. patent application Ser. No. 14/675,765 is also a Continuation-in-Part (CIP) of U.S. patent application Ser. No. 14/566,723, filed on Dec. 11, 2014, now U.S. Pat. No. 9,071,969; which is a Continuation of U.S. patent application Ser. No. 13/922,271, filed on Jun. 20, 2013, now U.S. Pat. No. 8,938,787; which is a Continuation-in-Part (CIP) of U.S. patent application Ser. No. 13/877,676, filed on Apr. 4, 2013, now U.S. Pat. No. 9,069,942; which is a National Stage of PCT International Application number PCT/IL2011/000907, having an International Filing Date of Nov. 29, 2011; which claims priority and benefit from U.S. provisional patent application No. 61/417,479, filed on Nov. 29, 2010; all of which are hereby incorporated by reference in their entirety.

The above-mentioned U.S. patent application Ser. No. 14/675,765 is also a Continuation-in-Part (CIP) of U.S. patent application Ser. No. 14/320,653, filed on Jul. 1, 2014, now U.S. Pat. No. 9,275,337; which claims priority and benefit from U.S. provisional patent application No. 61/843,915, filed on Jul. 9, 2013; all of which are hereby incorporated by reference in their entirety.

The above-mentioned U.S. patent application Ser. No. 14/675,765 is also a Continuation-in-Part (CIP) of U.S. patent application Ser. No. 14/320,656, filed on Jul. 1, 2014; which claims priority and benefit from U.S. provisional patent application No. 61/843,915, filed on Jul. 9, 2013; all of which are hereby incorporated by reference in their entirety.

The above-mentioned U.S. patent application Ser. No. 14/675,765 is also a Continuation-in-Part (CIP) of U.S. patent application Ser. No. 14/325,393, filed on Jul. 8, 2014; which claims priority and benefit from U.S. provisional patent application No. 61/843,915, filed on Jul. 9, 2013; all of which are hereby incorporated by reference in their entirety.

The above-mentioned U.S. patent application Ser. No. 14/675,765 is also a Continuation-in-Part (CIP) of U.S. patent application Ser. No. 14/325,394, filed on Jul. 8, 2014; which claims priority and benefit from U.S. provisional patent application No. 61/843,915, filed on Jul. 9, 2013; all of which are hereby incorporated by reference in their entirety.

The above-mentioned U.S. patent application Ser. No. 14/675,765 is also a Continuation-in-Part (CIP) of U.S. patent application Ser. No. 14/325,395, filed on Jul. 8, 2014; which claims priority and benefit from U.S. provisional patent application No. 61/843,915, filed on Jul. 9, 2013; all of which are hereby incorporated by reference in their entirety.

The above-mentioned U.S. patent application Ser. No. 14/675,765 is also a Continuation-in-Part (CIP) of U.S. patent application Ser. No. 14/325,396, filed on Jul. 8, 2014; which claims priority and benefit from U.S. provisional patent application No. 61/843,915, filed on Jul. 9, 2013; all of which are hereby incorporated by reference in their entirety.

The above-mentioned U.S. patent application Ser. No. 14/675,765 is also a Continuation-in-Part (CIP) of U.S. patent application Ser. No. 14/325,397, filed on Jul. 8, 2014, now U.S. Pat. No. 9,450,971; which claims priority and benefit from U.S. provisional patent application No. 61/843,915, filed on Jul. 9, 2013; all of which are hereby incorporated by reference in their entirety.

The above-mentioned U.S. patent application Ser. No. 14/675,765 is also a Continuation-in-Part (CIP) of U.S. patent application Ser. No. 14/325,398, filed on Jul. 8, 2014, now U.S. Pat. No. 9,477,826; which claims priority and benefit from U.S. provisional patent application No. 61/843,915, filed on Jul. 9, 2013; all of which are hereby incorporated by reference in their entirety.

FIELD

The present invention is related to the security of electronic devices and systems.

BACKGROUND

Millions of people utilize mobile and non-mobile electronic devices, such as smartphones, tablets, laptop computers and desktop computers, in order to perform various activities. Such activities may include, for example, browsing the Internet, sending and receiving electronic mail (email) messages, taking photographs and videos, engaging in a video conference or a chat session, playing games, or the like.

Some activities may be privileged, or may require authentication of the user in order to ensure that only an authorized user engages in the activity. For example, a user may be required to enter a username and a password in order to access an email account, or in order to access an online banking interface or website.

SUMMARY

The present invention may include, for example, systems, devices, and methods for detecting identity of a user of an electronic device; for determining whether or not an electronic device is being used by a fraudulent user or by a legitimate user; and/or for differentiating among users of a computerized service or among users of an electronic device.

Some embodiments of the present invention may comprise devices, systems, and methods of detecting user identity, differentiating between users of a computerized service, and detecting a possible attacker.

The present invention may provide other and/or additional benefits or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements or components. The figures are listed below.

FIG. 3D is a schematic illustration of a map representation, in accordance with some embodiments of the present invention;

FIG. 3E is a schematic illustration of another map representation, in accordance with some embodiments of the present invention.

DETAILED DESCRIPTION OF THE PRESENT INVENTION

Figure 1:
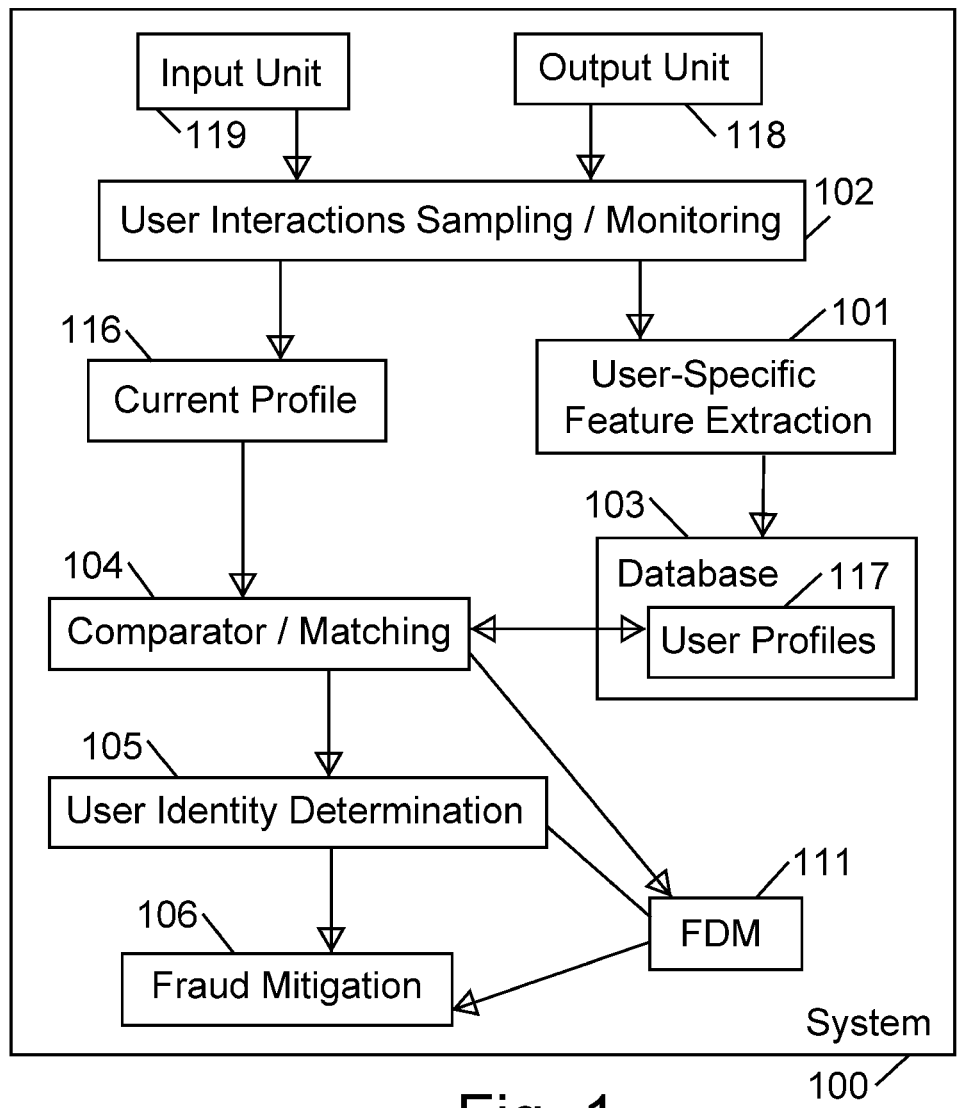
FIG. 1 is a schematic block-diagram illustration of a system, in accordance with some demonstrative embodiments of the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Some embodiments may generate and provide a visualization tool, such as an investigator console visualizer, enabling an analyst or investigator to visualize hacking operations, fraudulent operations and/or security attacks or cyber-attacks.

Applicants have realized that the IT department or the security department of some corporate entities (e.g., banking institutions, credit card companies) may be interested in obtaining visualized and/or summarized and/or graphical data about hacking attempts and attacks, in addition to receiving alerts or alarms about such hacking attempts and attacks.

Applicants have realized that such visualization tool may allow the organization to enrich its knowledge about the modus operandi of attackers, and may allow to define manual rules and/or automated rules for handling similar situations or attacks, based on analysis of past attacks and hacking attempts.

Applicants have realized that current tools may not be able to store, provide and/or replay behavioral components or behavioral elements of an attack or a hacking attempt, during the hacking session and/or subsequent to the hacking session; and may not be able to show to the organization the exact behavior of the attacker, and may not allow the organization to research the particular modus operandi of the attacker.

Applicants have realized that in conventional systems, a fraud investigator or a fraud-department team-member may be required to manually review or examine, or sift through, numerous textual records or rows-of-data, spreadsheets, and possibly hundreds or thousands of lines (or pages) relating to user-interactions; thereby investing a significant amount of time in a time-consuming and error-prone task.

Applicants have realized that there lacks an efficient visualized tool that may save hundreds of man-hours of manual sifting through large amounts of fraud-related data that may be accumulated in a banking system, a brokerage system, or in a "cloud computing" repository or other "big data" repository or system.

The system of the present invention comprise a visualization module, able to expose and visualize behavioral elements and/or behavioral patterns that may characterize a particular attack or a series or batch or groups of cyber-attacks; taking into account behavioral and/or biometric characteristics of such attacker(s), and/or taking into accounts the varying behavioral and/or biometric characteristics that may differ among legitimate users versus attackers, under one or more modifiable contexts or conditions. The system may enable real-time analysis (or, retrospective analysis or review) of such cyber-attacks and hacking attempts or other fraud incidents; as well as after-the-fact or retrospective analysis thereof, by using the visualization tool or console or module.

Reference is made to FIG. 1, which is a schematic block-diagram illustration of a system 100 in accordance with some demonstrative embodiments of the present invention. System 100 may comprise, for example, an input unit 119, an output unit 118, a user interactions sampling/monitoring module 102, a user-specific feature extraction module 101, a database 103 to store user profiles 117, an ad-hoc or current user profile 116, a comparator/matching module 104, a user identity determination module 105, a Fraud Detection Module (FDM) 111, and a fraud mitigation module 106.

System 100 may monitor interactions of a user with a computerized service, for example, user interactions performed via an input unit 119 (e.g., mouse, keyboard, stylus, touch-screen) and an output unit 118 (e.g., monitor, screen, touch-screen) that the user utilizes for such interactions at the user's computing device (e.g., smartphone, tablet, laptop computer, desktop computer, or other electronic device). For example, a user interactions monitoring/sampling module 102 may monitor all user interactions via input unit 119 and/or output unit 118; and may record, log, track, capture, or otherwise sample such user interactions; and/or may otherwise collect user interaction data.

In a demonstrative implementation, for example, an end-user may utilize a computing device or an electronic device in order to launch a Web browser and browse to a website or web-based application of a computerized service (e.g., a banking website, a brokerage website, an online merchant, an electronic commerce website). The web-server of the computerized service may serve code, for example HTML code, that the Web browser of the end-user device may parse and may display and/or execute. In accordance with the present invention, for example, a JavaScript code or code-portion may be served to the Web-browser of the end-user device; or may otherwise be "called from" or loaded from an HTML page that is served to the end-user device. The JavaScript code may operate as a "silent key-logger" module, and may monitor an track and log all the user interactions via keyboard, mouse, touch-screen, and/or other input units, as well as their timing; and may write or upload or send such information to the web-server or to a third-party server in which the user interactions monitoring/sampling module 102 may reside. In some embodiments, such "silent key-logger" may be implemented such that it logs or records or stores or uploads to the server, or analyzes, only anonymous data, or only data that excludes the actual content of user interactions, or only data that on its own does not enable identification of the user or of the content that the user types; e.g., by logging or storing only the data-entry rate or timing, or the key-presses rate or timing, and while not storing (or while discarding) the actual key-presses or content types; for example, logging and storing that the user typed eight characters in two seconds, rather than logging and typing that the user types the word "Jonathan" in two seconds. The data describing the user interactions may be sent or uploaded, for example, every pre-defined time interval (e.g., every second, or every 3 or 5 or 10 seconds), or once a buffer of interactions is filled (e.g., once 20 keystrokes are logged; once 6 mouse-clicks are logged). Other suitable methods may be used to monitor and log user interactions.

The user interaction data may enable a user-specific feature extraction module 101 to extract or estimate or determine or calculate user-specific features that characterize the interaction and which are unique to the user (or, which are probably unique to the user). The user-specific feature extraction module 101 may store in a database 103 multiple user profiles 117, corresponding to various users of the computerized service. A user may have a single stored profile 117; or a user may have multiple stored profiles 117 that correspond to multiple usage sessions of that user (e.g., across multiple days; or across multiple usage sessions that begin with a log-in and end with a log-out or a time-out).

Once a user accesses (or attempts to access) the computerized service, and/or during the access of the user to the computerized service, the user interaction monitoring/sampling module 102 may monitor or sample the current user interactions; and the user-specific feature extraction module 101 may optionally create a current or ad-hoc user profile 116 that characterizes the user-specific features that are currently exhibited in the current session of user interactions.

A comparator/matching module 104 may compare or match, between: (i) values of user-specific features that are extracted in a current user session (or user interaction), and (ii) values of respective previously-captured or previously-extracted user-specific features (of the current user, and/or of other users, and/or of pre-defined sets of values that correspond to known automated scripts or "bots"). In some implementations, the comparator/matching module 104 may compare between the current ad-hoc user profile 116, and one or more previously-stored user profiles 117 that are stored in the database 103.

If the comparator/matching module 104 determines that one or more features, or a set of features, that characterize the current interaction session of the current user, does not match those features as extracted in previous interaction session(s) of that user, then, a possible-fraud signal may be generated and may be sent or transmitted to other modules of the system 100 and/or to particular recipients.

Additionally or alternatively, the comparator/matching module 104 may compare the features characterizing the current session of the current user, to features characterizing known automatic fraudulent mechanisms, known as malware or "bot" mechanisms, or other pre-defined data, in order to determine that, possibly or certainly, the current user is actually a non-genuine user and/or is accessing the service via a fraudulent mechanism.

In some embodiments, the comparator/matching module 104 may comprise, or may operate in association with, a Fraud Detection Module (FDM) 111, which may comprise (or may be implemented as) one or more sub-modules, as described herein.

In some embodiments, the output of the comparator/matching module 104 may be taken into account in combination with other information that the fraud detection module 111 may determine to be relevant or pertinent, for example, security information, user information, metadata, session data, risk factors, or other indicators (e.g., the IP address of the user; whether or not the user is attempting to perform a high-risk activity such as a wire transfer; whether or not the user is attempting to perform a new type of activity that this user did not perform in the past at all, or did not perform in the past 1 or 3 or 6 or 12 months or other time-period; or the like).

The combined factors and data may be taken into account by a user identity determination module 105, which may determine whether or not the current user is a fraudster or is possibly a fraudster. The user identity determination module 105 may trigger or activate a fraud mitigation module 106 able to perform one or more fraud mitigating steps based on that determination; for example, by requiring the current user to respond to a challenge, to answer security question(s), to contact customer service by phone, to perform a two-step authentication or two-factor authentication, or the like.

System 100 may be implemented by using suitable hardware components and/or software modules, which may be co-located or may be distributed over multiple locations or multiple devices. Components and/or modules of system 100 may interact or communicate over one or more wireless communication links, wired communication links, cellular communication, client/server architecture, peer-to-peer architecture, or the like.

Figure 2:
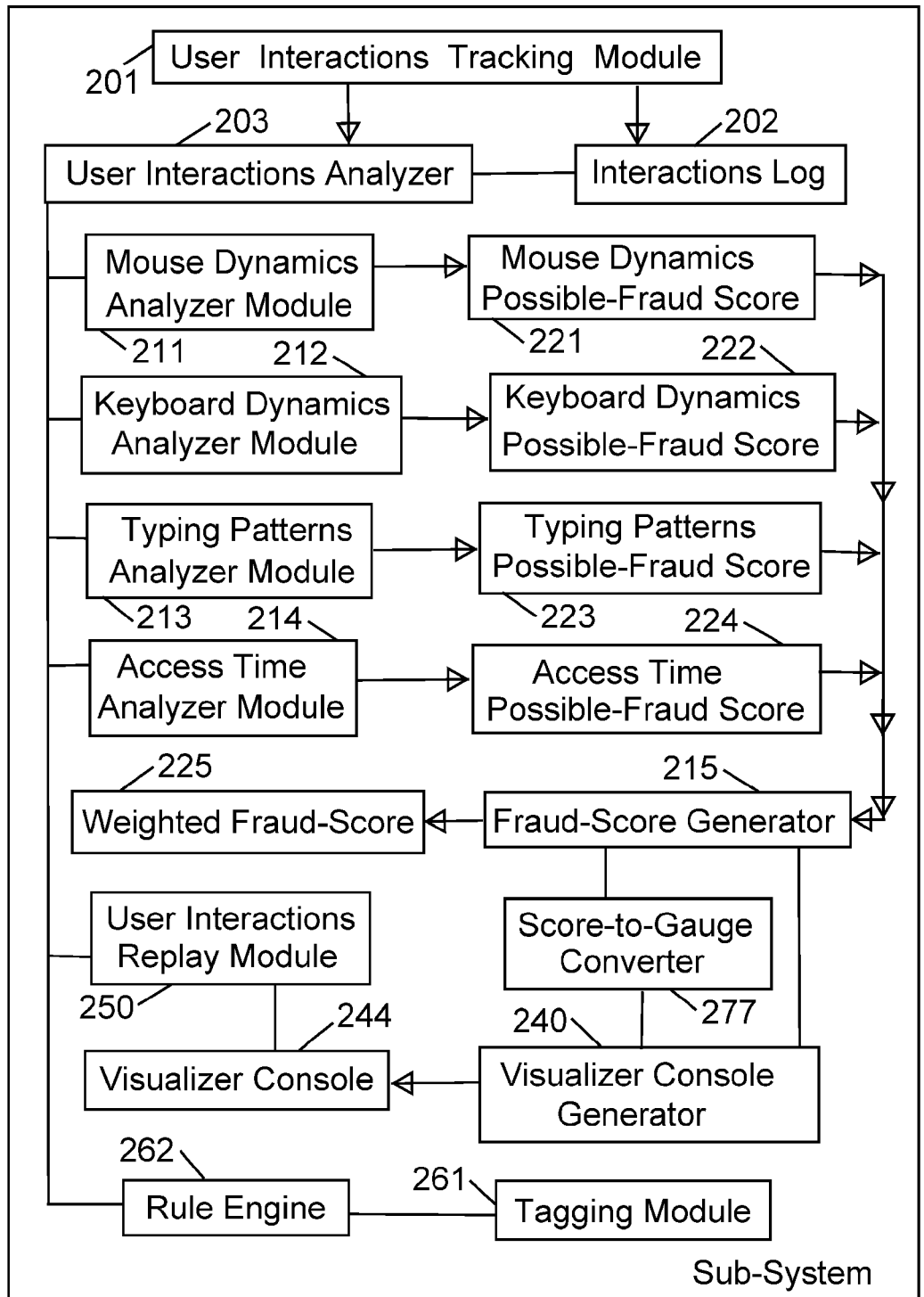
FIG. 2 is a schematic block-diagram illustration of a fraud detection sub-system, in accordance with some demonstrative embodiments of the present invention.

Reference is made to FIG. 2, which is a schematic block-diagram illustration of a fraud detection sub-system 200 in accordance with some demonstrative embodiments of the present invention. Sub-system 200 may operate to detect or to estimate, for example: fraud, fraud attempts, fraudulent computerized operations, unauthorized computerized operations, computerized operations that breach or violate a law or a regulation or policy or terms-of-use or an intended use of a service or website or application, or fraudulent activity.

Sub-system 200 may further operate to distinguish or differentiate among users (or to detect fraud) based on classification of features and their dependency on particular hardware and/or software being used by the end-user. Sub-system 200 may be implemented as part of, or as a sub-module of, the fraud detection module 111 of FIG. 1, the system 100 of FIG. 1, and/or other suitable systems or modules.

Sub-system 200 may comprise a user interaction tracking module 201, which may track the user interactions (e.g., keyboard presses, mouse-clicks, mouse-movements, touch-screen taps, and/or other user gestures) when the user interacts with a computerized service via an electronic device (e.g., desktop computer, laptop computer, tablet, smartphone, or the like). The user interaction tracking module 201 may observe and/or record and/or log all such user interactions, and may optionally store them in an interactions log 202 or other database or repository.

A user interactions analyzer 203 may review the tracked user interaction, in real time, or substantially in real time (e.g., within one second or within three seconds of the occurrence or completion of an interaction), or at pre-defined time intervals (e.g., every ten seconds, every 60 seconds), or at pre-defined triggering events (e.g., upon clicking of a "submit" button or a "confirm" button of an online form), or in retrospect (e.g., once a day in retrospect for all the daily interactions that reflect transactions that are in a pipeline for review prior to execution; or as part of a post-action audit process or crime investigation process). The user interactions analyzer 203 may look for a particular user interaction, or for a set or sequence or group or batch of consecutive user interactions, or for a set or sequence or group or batch of non-consecutive user interactions, that are pre-defined in the system as indicative of possible fraud activity (or alternatively, as pre-defined in the system as indicative of legitimate non-fraudulent activity).

In a demonstrative implementation, a mouse dynamics analyzer module 211 may analyze the mouse-related user interactions to detect or determine user interactions that may indicate, taken individually by themselves (or taken in combination with other interactions or with other data) that the current user is a cyber-attacker (or conversely, that the current user is an authorized user). For example, the mouse dynamics analyzer module 211 may detect that the rate or speed of mouse-clicks indicates a highly-experienced user which may be an experienced hacker; or that the lack of manual correction of mouse-movement, in response to an injected interference of deviating the mouse-pointer during its on-screen travel route, indicates an automated script or a cyber-attack "bot" or malware rather than an authorized human user. Accordingly, the mouse dynamics analyzer module 211 may generate a mouse dynamics possible-fraud score 221; for example, on a scale of 0 to 100, or on a scale of 0 to 1,000, or using other suitable scale.

Similarly, a keyboard dynamics analyzer module 212 may analyze the keyboard-related user interactions to detect or determine user interactions that may indicate, taken individually by themselves (or taken in combination with other interactions or with other data) that the current user is a cyber-attacker (or conversely, that the current user is an authorized user). For example, the keyboard dynamics analyzer module 212 may detect that the rate or speed of data-entry via keyboard indicates a highly-experienced user which may be an experienced hacker; or may detect a high-rate or excessive-usage of rapid copy-and-paste operations when filling-out data in online forms, thereby indicating a possible cyber-attacker who copies-and-pastes data from a prepared sheet with victim details; or the like. Accordingly, the keyboard dynamics analyzer module 212 may generate a keyboard dynamics possible-fraud score 222; for example, on a scale of 0 to 100, or on a scale of 0 to 1,000, or using other suitable scale.

Similarly, a typing patterns analyzer module 213 may analyze the data-entry related user interactions to detect or determine user interactions that may indicate, taken individually by themselves (or taken in combination with other interactions or other data) that the current user is a cyber-attacker (or conversely, that the current user is an authorized user). For example, the typing patterns analyzer module 213 may detect that the data-entry or typing speed or rate indicates that the user is a highly-experienced attacker; or that the lack of deletion operations in sophisticated fields (such as beneficiary name or beneficiary account number) indicates that the user is a cyber-attacker who copies data carefully and without mistakes, in contrast with an authorized user who may typically make mistakes in typing and then correct them; or that the user performed deletion operations in fields that an authorized user typically does not make mistakes in (such as, username field, password field, first-name field, last-name field), etc. Accordingly, the typing patterns analyzer module 213 may generate a typing patterns possible-fraud score 223; for example, on a scale of 0 to 100, or on a scale of 0 to 1,000, or using other suitable scale.

Similarly, an access time analyzer module 214 may analyze time-related or timing-related aspects of data-entry or other user interactions to detect or determine user interactions that may indicate, taken individually by themselves (or taken in combination with other interactions or with other data) that the current user is a cyber-attacker (or conversely, that the current user is an authorized user). For example, a significantly short time spent on filling-out of multiple complicated fields in an online form, may indicate that the user is actually a cyber-attacker who copies the data from a prepared list of victim data; particularly if this is the first time that the currently-examined account (e.g., bank account) is performing such operation or transaction. Other time-related or timing-related data may trigger a possible fraud indication; for example, excessive log-in attempts or excessive logged-in sessions; utilization or the computerized service during a time in which the user is expected to be sleeping or less available (e.g., at 3:30 AM local time of the account owner); or the like. The access time analyzer module 214 may detect that the time-related or timing-related insights seem to indicate that the user is a highly-experienced attacker. Accordingly, the access time analyzer module 214 may generate an access time possible-fraud score 224; for example, on a scale of 0 to 100, or on a scale of 0 to 1,000, or using other suitable scale.

A fraud-score generator 215 may generate a fraud-score or a weighted fraud-score 225, based on the generated scores 221-224. For example, an average or median sore may be generated, based on the generated scores 221-224 or based on some of them. In some embodiments, each one of the generated scores 221-224 may be associated (e.g., using a lookup table or other weighting parameter) with a weight or relative-weight, and a weighted score or weighted average may be generated by the fraud-score generator 215.

A fraud investigator visualizer console generator 240 may generate a fraud investigator visualizer console 244 comprising one or more visual representations, graphical representation, or other on-screen representations, which may efficiently and concisely indicate to the investigator or the researcher one or more of the generated scores 221-225. For example, each one of scores 221-225 may be displayed as a gauge, a circular gauge, a partially-circular gauge, a slider, a spectrum, a linear spectrum, a pie chart, a graph, or other suitable graphical representation.

Optionally, a score-to-gauge converter 277 (or other gauge generator, or GUI element generator) may be used in order to generate a suitable graphic illustration depicting a gauge, a needle, and a pointing of the needle towards the suitable location or region of the gauge. For example, a gauge-frame may be generated as a partial-circle (e.g., comprising approximately 80% of an entire circular ring or circle); a left-side corner or end or edge may be defined as a lower-limit (e.g., value of zero); a right-side corner or end or edge may be defined as an upper-limit (e.g., value of 100 or 1000); and the length of the curved ring in between the two edges, may correspond to the entire numerical range. The needle may be drawn to point to the suitable numerical value; for example, if the entire range is from 0 to 100, and the current score-value is 40, then the needle may be drawn to point towards a particular location along the ring which is located ⅖ away from the left-side corner and is located ⅗ away from the right-side corner. Other suitable methods may be used.

In some embodiments, a user interactions replay module 250 may enable the fraud investigator to request a step-by-step replay, or slowed-down replay, or real-life-speed replay, or a summarized replay or a high-speed replay, of the actual user interaction of the particular user or account being reviewed or investigates. For example, the user interactions replay module 250 may present the actual screen or form that the user had used; and may emulate or simulate on such displayed screen or form, the actual mouse-movement and/or typing that the user had performed, at their exact timing and rate and speed and locations, as previously logged and recorded in the interactions log 202. This may enable the fraud investigator to actually see and visualize in a direct manner, without machine interpretations, the actual incident or fraud-incident that is being reviewed or investigated. Some embodiments of the present invention may thus enable full visualization of the cyber-attack or the investigated incident, as if a "security camera" had been located behind the shoulders of the cyber-attacker during the attack and recorded or captured the screen and the user interactions for subsequent replay.

Figure 3A:
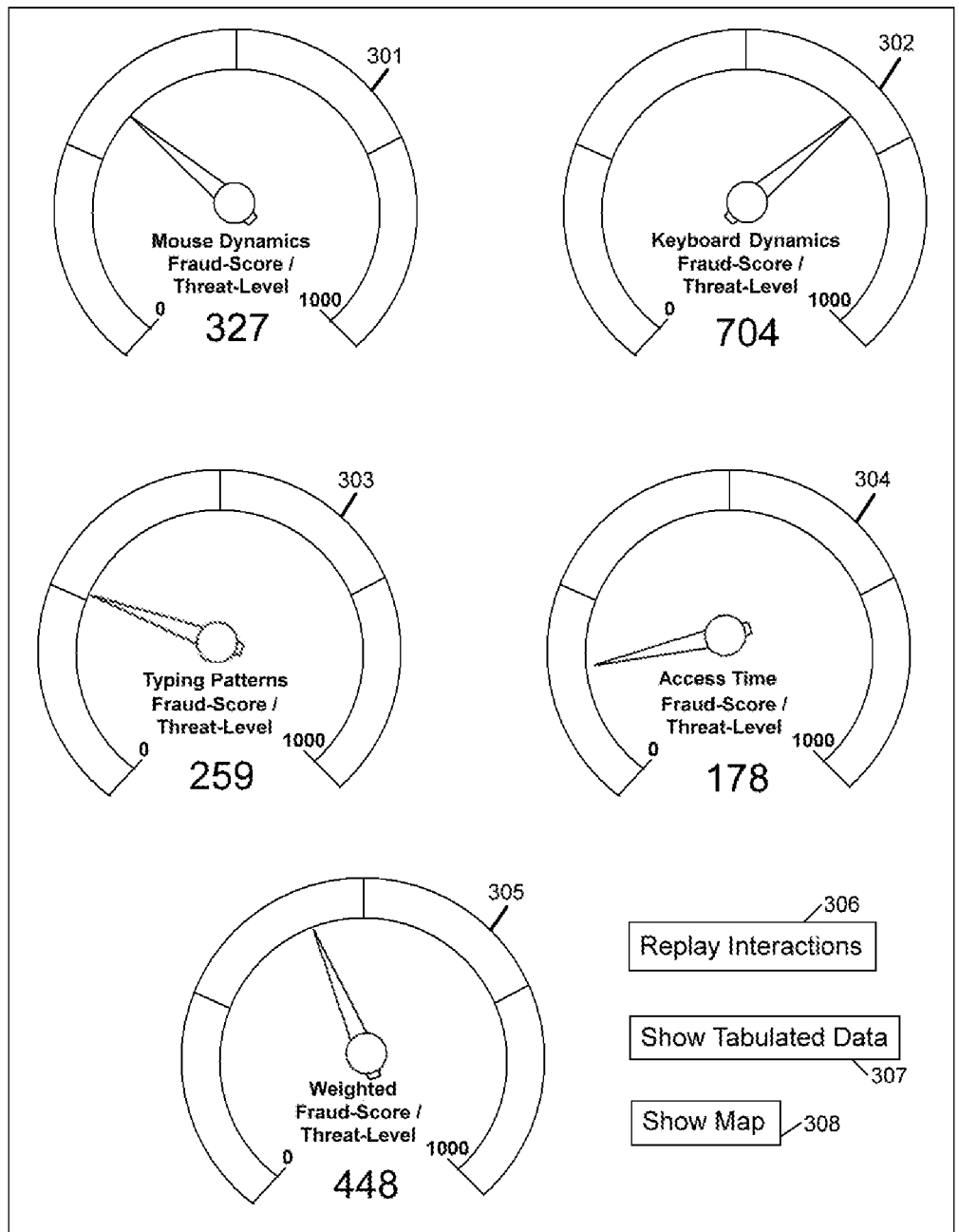
FIG. 3A is a schematic illustration of a computerized user interface, in accordance with some demonstrative embodiments of the present invention.

Reference is made to FIG. 3A, which is an illustration of a computerized interface 300, in accordance with some demonstrative embodiments of the present invention. Interface 300 may be or may comprise, for example, a fraud investigator or fraud researcher Visualization Console.

Interface 300 may comprise one or more gauges, or other GUI elements or graphical elements, in order to efficiently visualize or efficiently represent a summarized version of the insights deduced from examining a significant number of user interactions. For example, a gauge 301 may indicate the fraud-score associated with monitored mouse dynamics; a gauge 302 may indicate the fraud-score associated with monitored keyboard dynamics; a gauge 303 may indicate the fraud-score associated with monitored typing patterns; a gauge 304 may indicate the fraud-score associated with monitored access time or other timing-related data; other suitable gauges or GUI elements may be used, to visualize or represent other suitable fraud-related parameters or summarized data.

Additionally or alternatively, a gauge 305 may indicate the (weighted) fraud-score calculated or generated based on the other discrete scores, and/or based on other parameters that the system may be aware of (e.g., taking into account the gender of the user; the age or age-range of the user; the country or location in which the user resides; the country or the location from which the user logged-in or accessed the computerized service; or the like).

Each gauge 301-305 may optionally display the name or label of the fraud-related score or parameter that is indicated by the gauge; as well as the "needle" of the gauge pointing towards the relative point or region on such gauge. Optionally, the actual score or numerical-value may be presented within or near each such gauge 301-305. Optionally, small lines or indicators may divide each gauge 301-305 into regions, to facilitate the quick understanding of the location to which the needle is pointing. Optionally, end-values (such as 0 and 100; or such as 0 and 1,000) may be displayed at or near the gauge, to remind the viewer of the value-limits of each gauge 301-305.

Optionally, a "Replay Interactions" button 306 (or other UI element) may allow the fraud investigator to command the system to play-back an animation or a video showing an emulation of the actual user interactions that were performed by the user, as recorded and logged in the interactions log. Optionally, the replay may be associated with other GUI elements, enabling the fraud investigator to pause the animation, to rewind, to fast-forward, to loop a portion of the animation, to stop the animation, to increase or decrease the playback speed, to zoom-in or zoom-out, to extract data or capture screen-shots or export data from the replayed animation, or the like.

For purposes of clarity, gauges 301-305 are shown as black-and-white wire-frame GUI elements. However, in some embodiments, gauges 301-305 (or other GUI elements) may utilize multiple colors in order to more efficiently convey the pertinent information to a fraud investigator.

Figure 3B:
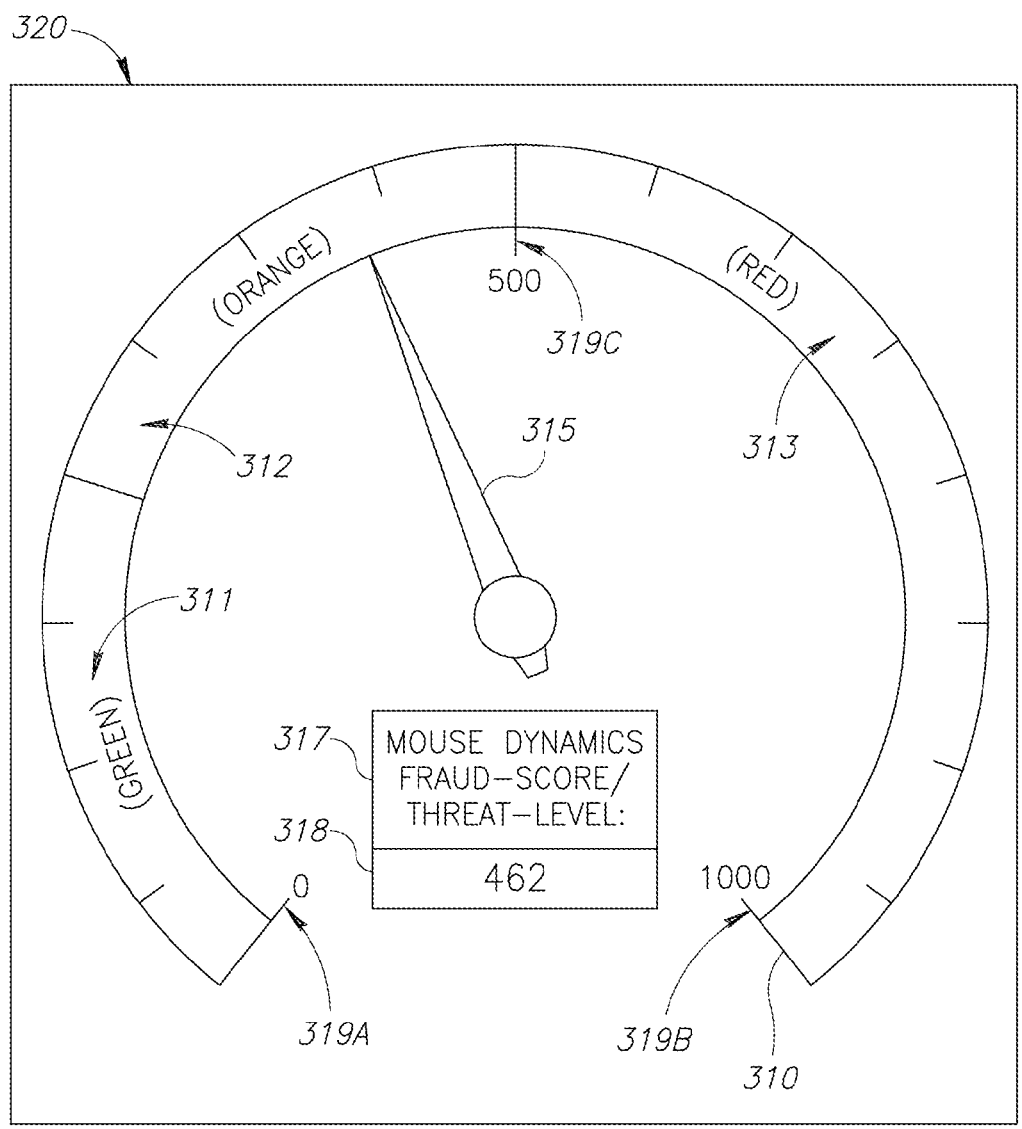
FIG. 3B is a schematic illustration of a computerized display having an on-screen fraud-detection gauge or cyber-fraud threat-level gauge, in accordance with some demonstrative embodiments of the present invention.

Reference is made to FIG. 3B, which is a schematic illustration of a computerized display 320 having an on-screen fraud-detection gauge 310 (or cyber-fraud threat-level gauge), in accordance with some demonstrative embodiments of the present invention. Gauge 310 may comprise a needle 315 and multiple regions, which may optionally be color-coded; for example: (A) a first region or "green region" or low fraud-risk region 311, such that when the needle 315 points to a value in the green region, low fraud-risk is indicated; (B) a second region or "orange region" or medium fraud-risk region 312, such that when the needle 315 points to a value in the yellow region, medium fraud-risk is indicated; (C) a third region or "red region" or high fraud-risk region 313, such that when the needle 315 points to a value in the red region, high fraud-risk is indicated. The regions need not have the same size or dimensions; for example, the high fraud-risk region 313 may be larger, or significantly larger (e.g., 1.5 larger or 2.0 larger) in size relative to region 312 or relative to region 311.

A textual or graphical label 317 may indicate which type of fraud-score or threat-level (e.g., mouse dynamics related) is represented by this gauge 310. A textual or numeric label 318 may indicate the numeric value of the fraud-score or threat-level (e.g., value of 462 on a scale of 0 to 1,000). Optionally, a lowest-limit indicator 319A may indicate the lowest-limit value (e.g., zero) of the range represented by the gauge circumference; an upper-limit indicator 319B may indicate the upper-limit value (e.g., 1,000) of that range; and one or more other indications, such as indication 319C, may indicate other locations-of-interest along that range (e.g., indication 319C demonstrating the half-way value of 500 in that range).

Figure 3C:
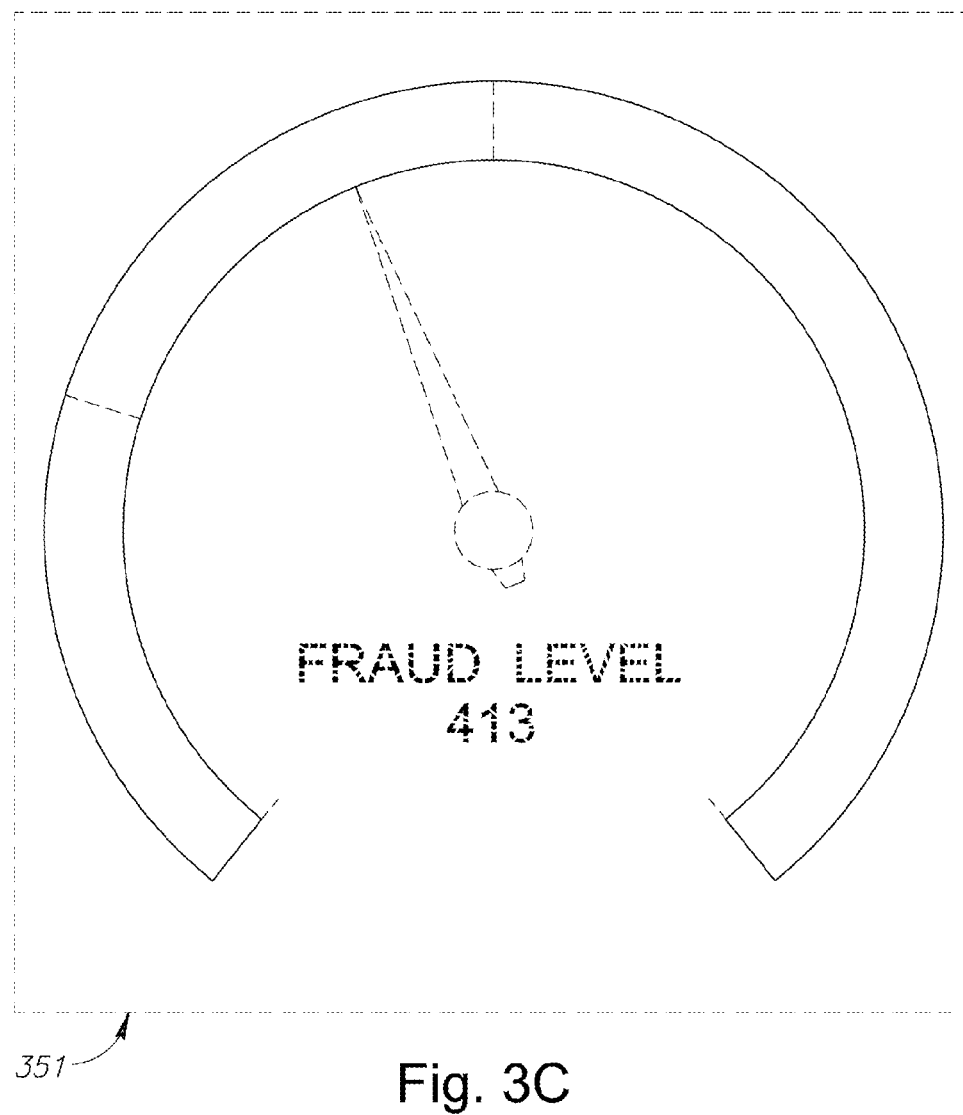
FIG. 3C is a schematic illustration of a computerized display having an on-screen fraud-detection gauge (or cyber-fraud threat-level gauge), in accordance with some demonstrative embodiments of the present invention.

Reference is also made to FIG. 3C, which is a schematic illustration of a computerized display 351 having an on-screen fraud-detection gauge (or cyber-fraud threat-level gauge), in accordance with some demonstrative embodiments of the present invention.

Referring again to FIG. 3A, optionally, a "Show Tabulated Data" button 307 may be displayed, enabling the fraud investigator to command the system to present or export or output additional data; for example, arranged in a table format or as spreadsheet, pertaining to the statistics of user interactions of the current usage session being investigated, compared with the general population of users, and/or compared with overall previous usage sessions of this particular user whose account is being investigated or reviewed.

In a demonstrative implementation, the tabulated (or otherwise formatted or structured) data may be generated and displayed or exported in a format similar to Table 1:

TABLE 1

Capitalization of Text

| Input Method Used | Number of Occurrences in Current Usage Session | % of Previous Usage Sessions of this Account | % over the General Population |
|---|---|---|---|
| Shift + Key | 2 | 0% | 12% |
| CAPS Lock | 5 | 100% | 68% |

In another demonstrative implementation, the tabulated (or otherwise formatted or structured) data may be generated and displayed or exported in a format similar to Table 2:

TABLE 2

Navigation among Fields within a Form

| Input Method Used | Number of Occurrences in Current Usage Session | % of Previous Usage Sessions of this Account | % over the General Population |
|---|---|---|---|
| Mouse + Click | 3 | 81% | 35% |
| Shift + Tab | 0 | 0% | 0% |
| Tab | 14 | 17% | 42% |

In another demonstrative implementation, the tabulated (or otherwise formatted or structured) data may be generated and displayed or exported in a format similar to Table 3:

TABLE 3

Deletion of Characters

| Input Method Used | Number of Occurrences in Current Usage Session | % of Previous Usage Sessions of this Account | % over the General Population |
|---|---|---|---|
| Sticky Backspace | 1 | 19% | 0% |
| Sticky Delete | 2 | 5% | 8% |
| Repeated Backspace | 0 | 93% | 74% |
| Repeated Delete | 0 | 96% | 61% |
| Select + Delete | 8 | 63% | 0% |
| Select + Backspace | 7 | 57% | 13% |

In another demonstrative implementation, the tabulated (or otherwise formatted or structured) data may be generated and displayed or exported in a format similar to Table 4:

TABLE 4

Form Submission

| Input Method Used | Number of Occurrences in Current Usage Session | % of Previous Usage Sessions of this Account | % over the General Population |
|---|---|---|---|
| Mouse Click | 9 | 77% | 0% |
| Enter key | 2 | 98% | 0% |
| Space bar | 5 | 16% | 48% |

In another demonstrative implementation, the tabulated (or otherwise formatted or structured) data may be generated and displayed or exported in a format similar to Table 5:

TABLE 5

Vertical Scrolling of Page/Form/Screen

| Input Method Used | Number of Occurrences in Current Usage Session | % of Previous Usage Sessions of this Account | % over the General Population |
|---|---|---|---|
| Sticky Arrow Key | 4 | 8% | 0% |
| Repeated Arrow Key | 12 | 82% | 12% |
| Page Down/Up Key | 0 | 42% | 24% |
| Mouse-Wheel Spin | 7 | 75% | 93% |

Other suitable tables or data-structures may be generated, based on the analysis of user interactions in the current usage session, in previous usage sessions of the account being reviewed, and/or in other usage sessions of other users (e.g., the general population of users, or a subset or group of such other users; for example, all the users who reside in a particular country or state; or all the users who performed a wire transfer).

Optionally, a "Show Map" button 308 may enable the fraud investigator to command the system to display or to export a map representation of the world or other geographical region (e.g., country; state; county; continent), with indications of the geo-locations from which usage sessions took place for the reviewed account.

For example, a map of the world may be shown; with a pin having the number "6" pointing at London, indicating that the user performed in the past six log-ins from London; and with another pin having the number "8" pointing at Miami, indicating that the user performed in the past eight log-ins from Miami; and with another pin showing in red color the number "1" indicating a single (e.g., current) usage session originating from Moscow.

For demonstrative purposes, FIG. 3D is a schematic illustration of a map representation 391 of Earth, in accordance with some embodiments of the present invention; showing multiple pins indicating multiple usage-sessions that accessed the presently-reviewed user-account from Central United States; further showing multiple pins indicating multiple usage-sessions that accessed the presently-reviewed user-account from Australia; and further showing a single pin indicating a single, isolated, usage-session that accessed the presently-reviewed user-account from Russia; thereby alerting the fraud investigator in an efficient and rapid manner to fraud possibility in the reviewed user account.

For demonstrative purposes, FIG. 3E is a schematic illustration of a map representation 392 of Earth, in accordance with some embodiments of the present invention; showing a single pin with the number "9" indicating nine usage-sessions that accessed the presently-reviewed user-account from Central United States; further showing a single pin with the number "7" indicating seven usage-sessions that accessed the presently-reviewed user-account from Australia; and further showing a single pin indicating the number "1" indicating a single, isolated, usage-session that accessed the presently-reviewed user-account from Russia; thereby alerting the fraud investigator in an efficient and rapid manner to fraud possibility in the reviewed user account. The system may aggregate or may group together, multiple pins or multiple geo-spatial locations, that are located within a pre-defined radius or distance from each other (or from a single pin among them), into a unified group that is represented by a single pin with a numeric value indicating the aggregate number of usage-sessions from that geographical area or vicinity or radius; thereby preventing an overcrowding of the map representations with dozens of overlapping pins, and thus facilitating and hastening the review by the fraud investigator. Other suitable maps, pins and/or indications may be calculated and presented.

Referring again to FIG. 2, some embodiments may enable the analyst or investigator to perform a step-by-step "replay" of the actions performed by the attacker or hacker (which may be recorded and stored as they are performed by the attacker); to locate and find other relevant data, such as past activity or past interactions of the same attacker; to filter or sort or modify the visualization based on one or more parameters; to perform link analysis; to perform "playback" of the input units (mouse, keyboard) as utilized by the attackers, while emphasizing or indicating particular traits of such utilization.

In some embodiments, the fraud researcher may utilize a tagging module 261 to tag or flag once a particular interaction as fraudulent or suspicious. Furthermore, a Rule Engine 262 may utilize machine learning in order to extrapolate or to subsequently identify, in real time, similar suspicious or fraudulent behaviors or interactions, which may then be used by the user interactions analyzer module 203 to generate or to trigger real-time alarms or alerts with regard thereto, in view of the rules generated by the Rule Engine 262.

In a demonstrative implementation, the system of the present invention may be utilized in order to investigate a fraudulent transaction or a suspicious wire transfer that was possibly performed by a hacker or attacker, as described herein.

Figure 4:
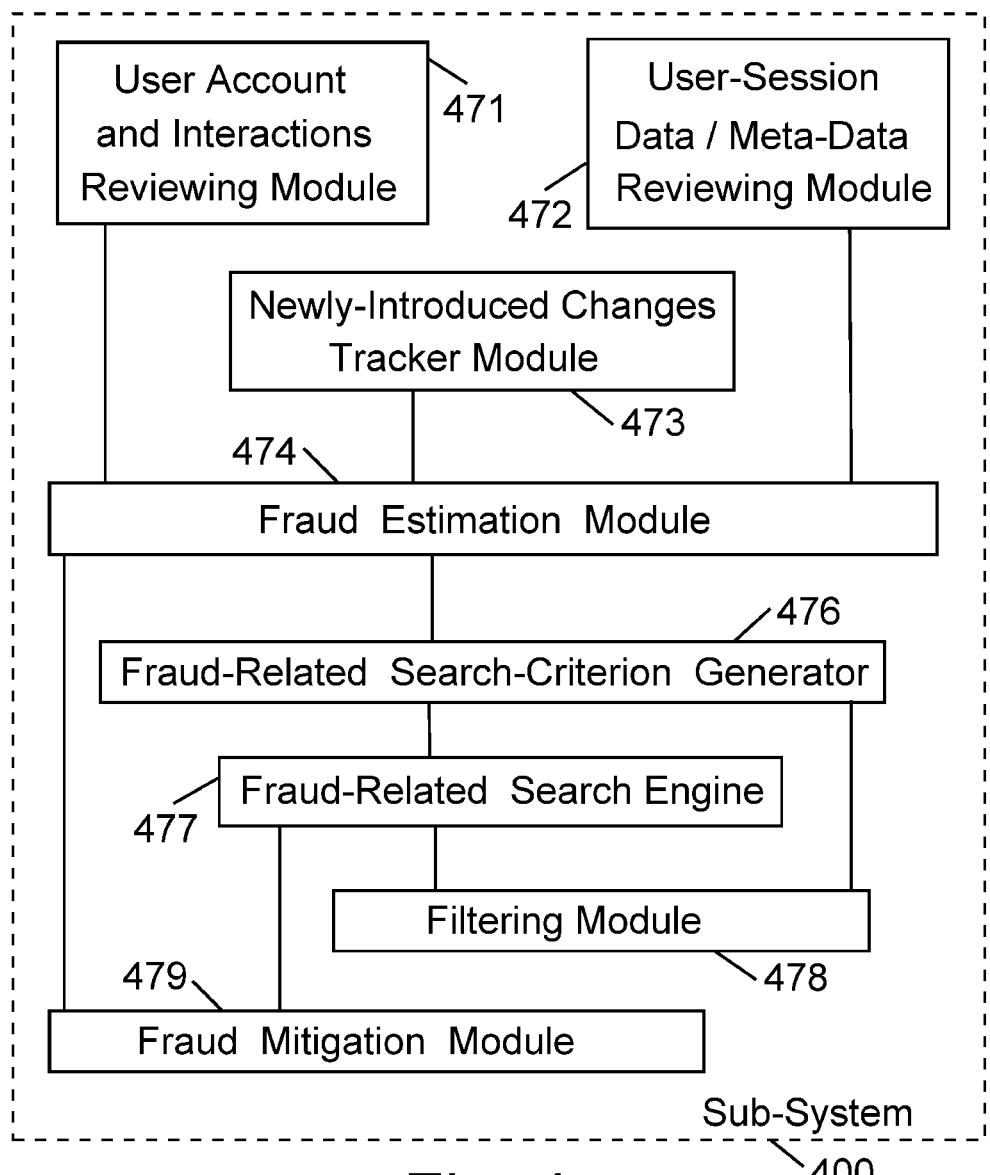
FIG. 4 is a schematic block-diagram illustration of another fraud detection sub-system, in accordance with some demonstrative embodiments of the present invention.

Reference is made to FIG. 4, which is a schematic block-diagram illustration of a fraud detection sub-system 400 in accordance with some demonstrative embodiments of the present invention. Sub-system 400 may be implemented as part of, or as a sub-module of, the fraud detection module 111 of FIG. 1, the system 100 of FIG. 1, and/or other suitable systems or modules.

In a demonstrative example, an analyst or investigator may utilize a User Account and Interactions Reviewing Module 471 in order to manually review and examine the past transactions of the user (or: of the account being reviewed), in the past 30 or 60 or 90 days; the analyst identifies a series of login sessions that were performed from a particular IP address located (for example) in Nevada, being a new IP address that was not used by this user in the past; but without yet identifying a suspicious activity in this series of login sessions.

Then, the analyst may utilize a User-Session Data/Metadata Reviewing Module 472 to review and discover that in the first login session from that new IP address, the logged-in user had examined some or all of the defined Beneficiaries (or payees), and performed a Copy operation of the beneficiaries' names, addresses, and/or past wire transfers data.

Then, the analyst may further recognize, using a Newly-Introduced Changes Tracker module 473 of the system of the present invention, that in the last or near-last login session from that new IP address, the user defined a new Beneficiary (or payee).

At this stage, a Fraud Estimation Module 474 may deduce that this series of login sessions and interactions were possibly performed by a hacker or cyber-attacker, in order to achieve one or more fraudulent goals, for example: (a) to make the banking system recognize the hacker as a "regular" non-harming user that simply logs-in from a new IP address without actually removing money from the account; and/or, (b) to allow the hacker to "learn" historic data about past wire transfers of the authorized user, in order to find or to add a suitable "mule" or destination that will allow the hacker to perform a wire transfer that will go through the bank wire system without triggering the banking system's transaction anomaly detector.

The fraud estimation module 474 may proceed to deduce, how to subsequently identify similar attackers and/or similar attacks in the future; and how to discover current transactions or series-of-transactions in which an attack is currently being carried out. For example, a fraud-related search criterion generator 476 may automatically generate a fraud-related search criterion or search query, and a fraud-related search engine 477 may utilize such criterion or query in order to search in the system for other users who logged-in from the flagged new IP address, but may not find adequate results. The system may proceed to search for all the users, who logged-in successfully in the past 30 or 60 days, from a new (firstly used) IP address that is located in Nevada; and this may yield a detailed list of results. It is noted that in some embodiments, fraud-related search engine 477 may search or may analyze a "fraud file" or other file or data-structure, which may include data or raw-data or partially-analyzed data or suspicious-data or possibly-suspicious data, or data that was at least partially sorted or filtered (e.g., based on user account, or based on IP address of accessing user, or based on geo-location of user(s), or based on time-date stamps, and/or based on a combination of such parameters or other parameters); and such "fraud file" or fraud-data file may be parsed and searched by the fraud-related search engine 477, based on the fraud-related search criteria that the fraud-related criterion generator 476 may generate.

Then, a filtering module 478 may filter the fraud-related search results based on one or more filtering criteria; for example, by commanding to include only search results in which the user has performed a Copy operation; and the results list may shrink to only few results. Further inspection, or further filtering by the system, may show that some of the members of the short-list, have also added a new Beneficiary (or new Payee) in the past 30 days, thereby indicating a possible hacked account.

The system may then proceed to trigger a fraud mitigation module 479 to take the suitable measures; for example, to place a temporary "hold" or "freeze" on the account, or to place an automated (or manual) telephone call to the customer to authenticate recent transactions, or to send an email message and/or text message or other notification that requires the account owner to authenticate or to call the customer service.

Optionally, as a mitigation route, the system may automatically erase, or put on "hold", the newly-added Beneficiary in order to prevent a fraudulent wire transfer to it. Optionally, the account owner may be placed into a High Risk list of users, such that subsequent adding of beneficiaries or payees may require additional security measures (e.g., typing of an ATM pin, or telephonic authentication by the user).

In some embodiments, the system may automatically define a new fraud-detection rule which characterizes this pattern of operations or series of operations, thereby enabling further automated detection of similar fraudulent series of operations in similar instances.

Some embodiments may generate a detailed Report and/or a Visualization Console, as demonstrated in the drawings, which may demonstrate for example: session metadata; authentication activity scores (e.g., taking into account: mouse dynamics, keyboard dynamics, typing parameters, access time); session flow; previous sessions map; account behavioral patterns (e.g., capitalization; navigation between form fields; deletion methods; cut-copy-paste operations; selection methods; intra-field navigation; form submission method; numeric input method; scrolling method; special mouse events; other input-related events; specific pattern(s) identified for using particular data fields, such as account field, password field, moving between fields in the login form, submitting the login form, amount field, date field); threat score(s), abnormal behavior score(s), device and network risk scores, login's history (e.g., based on Internet Protocol (IP) address, WHOIS data for IP address, Web-browser used, Operating System (OS) used, screen size used, language used), device and network attributes, and/or other data; as well as interface allowing an analyst to provide comments and/or to classify the observed session (e.g., as confirmed fraud, as confirmed genuine, as suspicious, as non-classified yet); and an interface allowing "playback" of video or animation demonstrating the user session interactions, step by step.

The present invention may differentiate or distinguish between the genuine (human) user, and a robot or a machine-operable module or function (e.g., implemented as a computer virus, a Trojan module, a cyber-weapon, or other malware) which attempts to automatically imitate or emulate or simulate movement of a cursor or other interaction with a touch-screen. For example, false identity created by automated malware may be detected by the present invention as such automated malware may lack the characterization of human (e.g., the manual activity having the particular user-specific traits, as described above).

The invention may operate and may provide an efficient biometric or user-authentication modality, without capturing, storing, or otherwise identifying any Personally Identifiable Information (PII). For example, the present invention may be used to distinguish between a genuine user and a fraudster, without knowing any PII of the genuine user and/or of the fraudster.

The present invention may detect correlations and extract user-specific traits based on passive data collection and/or based on active challenges. In passive data collection, the device may detect that the user is performing a particular operation (e.g., a vertical scroll gesture), and may further detect that performing this gesture affects in a user-specific way the acceleration and/or the orientation/rotation of the mobile device. In an active challenge, the device (or an application or process thereof) may actively present a challenge to the user, such as, a requirement to the user to perform horizontal scrolling, in order to capture data and detect user-specific correlation(s). The active challenge may be hidden or may be unknown to the user, for example, implemented by creating a Graphical User Interface (GUI) that requires the button to scroll in order to reach a "submit" button or a "next" button or a "continue" button, thereby "forcing" the user to unknowingly perform a particular user-gesture which may be useful for correlation detection or for extraction of user-specific traits, as described. Alternatively, the active challenge may be known to the user, and may be presented to the user as an additional security feature; for example, by requesting the user to drag and drop an on-screen object from a first point to a second point, as an action that may be taken into account for confirming user identity.

Some embodiments may be implemented, for example, as a built-in or integrated security feature which may be a component or a module of a system or device, or may be a downloadable or install-able application or module, or plug-in or extension; or as a module of a web-site or webpage, or of a client-server system or a "cloud computing" system; or as machine-readable medium or article or memory unit able to store instructions and/or code which, when executed by the mobile device or by other suitable machine (e.g., a remote server, or a processor or a computer) cause such machine to perform the method(s) and/or operations described herein. Some units, components or modules, may be implemented externally to the user device, may be implemented in a remote server, a web server, a website or webpage, a "cloud computing" server or database, a client/server system, a distributed system, a peer-to-peer network or system, or the like.

The present invention may be used in conjunction with various suitable devices and systems, for example, various devices that have a touch-screen; an ATM; a kiosk machine or vending machine that has a touch-screen; a touch-keyboard; a system that utilizes Augmented Reality (AR) components or AR glasses (e.g., Google Glass); a device or system that may detect hovering gestures that do not necessarily touch on the screen or touch-screen; a hovering screen; a system or device that utilize brainwave analysis or brainwave control in which the user's brainwaves are captured or read and the user's brain may directly control an application on the mobile device; and/or other suitable devices or systems.

In accordance with some demonstrative embodiments of the present invention, a method may comprise: monitoring user interactions of a user, who utilizes a computing device to interact with a computerized service during a usage session; and for each particular type of data entry method that the user utilizes during said usage session: calculating a current number of occurrences of utilization of said particular type of data entry method during said usage session, and generating output corresponding to said current number of occurrences during said usage session; calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio; based on (i) said current number of occurrences, and (ii) said average number of occurrences during previous usage sessions of said user, determining whether said user is an authorized user or a cyber-attacker.

In some embodiments, the method comprises: based on (i) said current number of occurrences, and (ii) said average number of occurrences during previous usage sessions of said user, generating a fraud-score value indicating a likelihood that said user is a cyber-attacker and is not an authorized user.

In some embodiments, the method may comprise: calculating a ratio between (a) said current number of occurrences of utilization of said particular type of data entry method during said usage session, and (b) an average number of occurrences of utilization of said particular type of data entry method during previous usage sessions of a general population of users; and generating output corresponding to said ratio; based on (i) said current number of occurrences, and (ii) said average number of occurrences during previous usage sessions of said general population of users, determining whether said user is an authorized user or a cyber-attacker.

In some embodiments, the method may comprise: based on (i) said current number of occurrences, and (ii) said average number of occurrences during previous usage sessions of said general population of users, generating a fraud-score value indicating a likelihood that said user is a cyber-attacker and is not an authorized user.

In some embodiments, the method may comprise: calculating a ratio between (a) said current number of occurrences of utilization of said particular type of data entry method during said usage session, and (b) an average number of occurrences of utilization of said particular type of data entry method during previous usage sessions of a group of users that excludes said user; and generating output corresponding to said ratio; based on (i) said current number of occurrences, and (ii) said average number of occurrences during previous usage sessions of said group of users that excludes said user, determining whether said user is an authorized user or a cyber-attacker.

In some embodiments, the method may comprise: based on (i) said current number of occurrences, and (ii) said average number of occurrences during previous usage sessions of said group of users that excludes said user, generating a fraud-score value indicating a likelihood that said user is a cyber-attacker and is not an authorized user.

In some embodiments, the method comprises: checking whether (A) said current number of occurrences of utilization of said particular type of data entry method during said usage session of said user, is different by at least a pre-defined number of percent points, from (B) a threshold value of occurrences that characterizes on average a batch of previous usage sessions of said user.

In some embodiments, said determining may comprise: checking whether (A) said current number of occurrences of utilization of said particular type of data entry method during said usage session of said user, is different by at least a pre-defined number of percent points, from (B) a threshold value of occurrences that characterizes on average a general population of other users of said computerized service.

In some embodiments, the determining may comprise: checking whether (A) said current number of occurrences of utilization of said particular type of data entry method during said usage session of said user, is different by at least a pre-defined number of percent points, from (B) a threshold value of occurrences that characterizes on average a group of users of said computerized service that excludes said user.

In some embodiments, the method may comprise: generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a batch of previous usage sessions of said other user, then generate a possible-fraud alert with regard to the account of said other user.

In some embodiments, the method may comprise: generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a general population of users of said computerized service, then generate a possible-fraud alert with regard to the account of said other user.

In some embodiments, the method may comprise: generating an automated machine-readable fraud-detection rule that detects a fraudulent transaction in an account of another user, wherein the automated machine-readable fraud-detection rule indicates that: if said other user exhibits (A) a current number of occurrences of utilization of said particular type of data entry method during a usage session of said other user, which is different by at least a pre-defined number of percent points, from (B) a threshold value of occurrences that characterizes on average a group of users of said computerized service that excludes said other user, then generate a possible-fraud alert with regard to the account of said other user.

In some embodiments, the method may comprise: based on said determining step, generating an automated machine-readable fraud-detection rule that detects a fraudulent transaction in an account of another user at said computerized service; automatically scanning data reflecting user interactions of said other user with the computerized service; automatically applying said machine-readable fraud-detection rule to said data to automatically determine whether said other user is a cyber-attacker.

In some embodiments, the method may comprise: based on said determining step, generating an automated machine-readable fraud-detection rule that detects a fraudulent transaction in an account of another user at said computerized service; receiving and parsing a fraud-file comprising data reflecting user interactions of one or more users with said computerized service; automatically applying said machine-readable fraud-detection rule to said data to automatically detect at least one other user that is possibly a cyber-attacker.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) generating a table comprising: (d1) the first data-entry method, the first-method current-session occurrence value, and the first-method aggregated occurrence value; and (d2) the second data-entry method, the second-method current-session occurrence value, and the second-method aggregated occurrence value.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; then, (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for usage sessions of other users, that occurred within a pre-defined time period prior to the particular usage session being reviewed, calculating: (c1) a first-method aggregated occurrence value, indicating the number of times that said other users utilized the first data-entry method to engage with said user-interface element during their previous usage sessions; (c2) a second-method aggregated occurrence value, indicating the number of times that said other users utilized the second data-entry method to engage with said user-interface element during their previous usage sessions; (c3) a first-ratio value indicating a ratio between (A) the first-method aggregated occurrence value of other users as calculated in step (c1), and (B) the first-method current-session occurrence value as calculated in step (b1); and (c4) a second-ratio value indicating a ratio between (A) the second-method aggregated occurrence value of other users as calculated in step (c2), and (B) the second-method current-session occurrence value as calculated in step (b2); then (d) generating and displaying a table comprising at least: (d1) the first data-entry method, and the first-ratio value; and (d2) the second data-entry method, and the second-ratio value.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said UI element during said previous usage sessions; and (c2) a second-method aggregated occurrence value, indicating the number of times that said user utilized the second data-entry method to engage with said UI element during said previous sage sessions; (d) if it is determined that the first-method current-session occurrence value as calculated in step (b1), is larger by at least a threshold percentage value relative to the first-method aggregated occurrence value as calculated in step (c1), then determining that said user is a cyber-attacker posing as said user.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said UI element during said previous usage sessions; and (c2) a second-method aggregated occurrence value, indicating the number of times that said user utilized the second data-entry method to engage with said UI element during said previous sage sessions; (d) if it is determined that the first-method current-session occurrence value as calculated in step (b1), is smaller by at least a threshold percentage value relative to the first-method aggregated occurrence value as calculated in step (c1), then determining that said user is a cyber-attacker posing as said user.

In some embodiments, the method may comprise: (a) for a particular type of user interaction with a user-interface element of said computerized service, defining at least: (a1) a first data-entry method that users can utilize to engage with said user-interface element, and (a2) a second data-entry method that users can utilize to engage with said user-interface element; (b) for a particular usage session of said user, which is being reviewed for possible fraud, calculating: (b1) a first-method current-session occurrence value, indicating the number of times that said user utilized the first data-entry method to engage with said UI element during said particular usage session being reviewed; and (b2) a second-method current-session occurrence value, indicating the number of times that said user utilized the second data-entry method to engage with said user-interface element during said particular usage session being reviewed; (c) for usage sessions of other users, that occurred within a pre-defined time period prior to the particular usage session being reviewed, calculating: (c1) a first-method aggregated occurrence value, indicating the number of times that said other users utilized the first data-entry method to engage with said UI element during their previous usage sessions; (c2) a second-method aggregated occurrence value, indicating the number of times that said other users utilized the second data-entry method to engage with said UI element during their previous usage sessions; (c3) a first-ratio value indicating a ratio between (A) the first-method aggregated occurrence value of other users as calculated in step (c1), and (B) the first-method current-session occurrence value as calculated in step (b1); (c4) a second-ratio value indicating a ratio between (A) the second-method aggregated occurrence value of other users as calculated in step (c2), and (B) the second-method current-session occurrence value as calculated in step (b2); (d) if the first-ratio value is greater than a pre-defined threshold ratio value, then determining that said user is a cyber-attacker posing as said user.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) generating a table comprising: (d1) the first data-entry method, the first-method current-session occurrence value, and the first-method aggregated occurrence value; and (d2) the second data-entry method, the second-method current-session occurrence value, and the second-method aggregated occurrence value.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for usage sessions of other users, that occurred within a pre-defined time period prior to the particular usage session being reviewed, calculating: (c1) a first-method aggregated occurrence value, indicating the number of times that said other users utilized the first data-entry method to engage with said user-interface element during their previous usage sessions; (c2) a second-method aggregated occurrence value, indicating the number of times that said other users utilized the second data-entry method to engage with said user-interface element during their previous usage sessions; (c3) a first-ratio value indicating a ratio between (A) the first-method aggregated occurrence value of other users as calculated in step (c1), and (B) the first-method current-session occurrence value as calculated in step (b1); (c4) a second-ratio value indicating a ratio between (A) the second-method aggregated occurrence value of other users as calculated in step (c2), and (B) the second-method current-session occurrence value as calculated in step (b2); (d) generating and displaying a table comprising at least: (d1) the first data-entry method, and the first-ratio value; and (d2) the second data-entry method, and the second-ratio value.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) if it is determined that the first-method current-session occurrence value as calculated in step (b1), is larger by at least a threshold percentage value relative to the first-method aggregated occurrence value as calculated in step (c1), then determining that said user is a cyber-attacker posing as said user.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for all previous usage sessions of said user, that occurred within a pre-defined time period prior to the particular usage session being reviewed, calculating: (c1) a first-method aggregated occurrence value, indicating the number of times that said user utilized the first data-entry method to engage with said user-interface element during said previous usage sessions; and (c2) a second-method aggregated occurrence value, indicating the number of times that said user utilized the second data-entry method to engage with said user-interface element during said previous sage sessions; (d) if it is determined that the first-method current-session occurrence value as calculated in step (b1), is smaller by at least a threshold percentage value relative to the first-method aggregated occurrence value as calculated in step (c1), then determining that said user is a cyber-attacker posing as said user.

In some embodiments, the method may comprise: (a) for a particular type of user interaction with a user-interface element of said computerized service, defining at least: (a1) a first data-entry method that users can utilize via a mouse-unit to engage with said user-interface element, and (a2) a second data-entry method that users can utilize via a keyboard to engage with said user-interface element; (b) for a particular usage session of said user, which is being reviewed for possible fraud, calculating: (b1) a first-method current-session occurrence value, indicating the number of times that said user utilized the first data-entry method to engage with said user-interface element during said particular usage session being reviewed; and (b2) a second-method current-session occurrence value, indicating the number of times that said user utilized the second data-entry method to engage with said user-interface element during said particular usage session being reviewed; (c) for usage sessions of other users, that occurred within a pre-defined time period prior to the particular usage session being reviewed, calculating: (c1) a first-method aggregated occurrence value, indicating the number of times that said other users utilized the first data-entry method to engage with said user-interface element during their previous usage sessions; (c2) a second-method aggregated occurrence value, indicating the number of times that said other users utilized the second data-entry method to engage with said user-interface element during their previous usage sessions; (c3) a first-ratio value indicating a ratio between (A) the first-method aggregated occurrence value of other users as calculated in step (c1), and (B) the first-method current-session occurrence value as calculated in step (b1); (c4) a second-ratio value indicating a ratio between (A) the second-method aggregated occurrence value of other users as calculated in step (c2), and (B) the second-method current-session occurrence value as calculated in step (b2); (d) if the first-ratio value is greater than a pre-defined threshold ratio value, then determining that said user is a cyber-attacker posing as said user.

In some embodiments, the method may comprise: (A) automatically scanning the user interactions performed in usage sessions of a batch of other users of said computerized service; (B) calculating separately for each account owner of said batch of other users, (B1) a first-method current-session occurrence value, indicating the number of times that said account owner utilized the first data-entry method to engage with said user-interface element during a particular usage session being reviewed; (B2) a first-method aggregated occurrence value, indicating the number of times that said other users except said account owner utilized the first data-entry method to engage with said user-interface element during their previous usage sessions; (B3) a first-ratio value indicating a ratio between (x) the first-method aggregated occurrence value calculated in step (B2), and (y) the first-method current-session occurrence value as calculated in step (B1); and (C) automatically generating a list of account owners, out of said other users of the computerized service, for which: the first-ratio value is greater than a pre-defined threshold ratio value.

In some embodiments, the method may comprise: (A) automatically scanning the user interactions performed in usage sessions of a batch of other users of said computerized service; (B) calculating separately for each account owner of said batch of other users, (B1) a first-method current-session occurrence value, indicating the number of times that said account owner utilized the first data-entry method to engage with said user-interface element during a particular usage session being reviewed; (B2) a first-method aggregated occurrence value, indicating the number of times that said other users except said account owner utilized the first data-entry method to engage with said user-interface element during their previous usage sessions; (B3) a first-ratio value indicating a ratio between (x) the first-method aggregated occurrence value calculated in step (B2), and (y) the first-method current-session occurrence value as calculated in step (B1); and (C) if the first-ratio value of said account owner is greater than a pre-defined threshold ratio value, then automatically determining that the account of said account user was exposed to a cyber-attack.

In some embodiments, the method may comprise: based on analysis of said user interactions, calculating a fraud-score value indicating a fraud-risk associated with said usage session; generating and displaying on a screen of a computer located remotely from said user, a graphical user interface (GUI) element which comprises: (A) an indication of said fraud-score value; (B) an indication of a lowest-limit fraud-score value; (C) an indication of an upper-limit fraud-score value.

In some embodiments, the generating and displaying may comprise: generating and displaying on said screen of said computer located remotely from said user, an on-screen gauge representation which comprises: an on-screen needle representation pointing to a particular location along a circumference of said on-screen gauge representation, the on-screen needle representation indicating a value between said lowest-limit fraud-score value and said upper-limit fraud-score value.

In some embodiments, the generating and displaying may comprise: generating and displaying on said screen of said computer located remotely from said user, an on-screen partial-ring-shaped gauge representation which comprises: an on-screen needle representation pointing to a particular location along a circumference of said on-screen partial-ring-shaped gauge representation; wherein a relative position of said particular location along the circumference of said on-screen partial-ring-shaped gauge representation, corresponds to the relative location of the fraud-score value along a number line that begins at the lowest-limit fraud-score value and ends with the upper-limit fraud-score value.

In some embodiments, the generating and displaying may comprise: generating and displaying on said screen of said computer located remotely from said user, an on-screen partial-ring-shaped gauge representation which comprises: an on-screen needle representation pointing to a particular location along a circumference of said on-screen partial-ring-shaped gauge representation; wherein: the circumference distance between said particular location and said indication of lowest-limit fraud-score value, divided by the circumference distance between said indication of lowest-limit fraud-score value and said indication of upper-limit fraud-score value, is generally equal to the fraud-score value minus the lowest-limit fraud-score value, divided by the difference between the upper-limit fraud-score value and the lowest-limit fraud-score value.

In some embodiments, the method may comprise: based on analysis of said user interactions performed via a mouse unit, calculating a mouse dynamics fraud-score value indicating a fraud-risk associated with said usage session; generating and displaying on the screen of said computer located remotely from said user, an on-screen generally-circular gauge element which comprises: (A) an indication of said mouse dynamics fraud-score value; (B) an indication of a lowest-limit fraud-score value associated with mouse dynamics; (C) an indication of an upper-limit fraud-score value associated with mouse dynamics.

In some embodiments, the method may comprise: based on analysis of said user interactions performed via keyboard, calculating a keyboard dynamics fraud-score value indicating a fraud-risk associated with said usage session; generating and displaying on the screen of said computer located remotely from said user, an on-screen generally-circular gauge element which comprises: (A) an indication of said keyboard dynamics fraud-score value; (B) an indication of a lowest-limit fraud-score value associated with keyboard dynamics; (C) an indication of an upper-limit fraud-score value associated with keyboard dynamics.

In some embodiments, the method may comprise: based on analysis of timings of said user interactions, calculating a timing-related fraud-score value indicating a fraud-risk associated with said usage session; generating and displaying on the screen of said computer located remotely from said user, an on-screen generally-circular gauge element which comprises: (A) an indication of said timing-related fraud-score value; (B) an indication of a timing-related lowest-limit fraud-score value; (C) an indication of a timing-related upper-limit fraud-score value.

In some embodiments, the method may comprise: based on analysis of access time reflected in said user interactions, calculating an access time fraud-score value indicating a fraud-risk associated with said usage session; generating and displaying on the screen of said computer located remotely from said user, an on-screen generally-circular gauge element which comprises: (A) an indication of said access time fraud-score value; (B) an indication of access time lowest-limit fraud-score value; (C) an indication of access time upper-limit fraud-score value.

In some embodiments, the method may comprise: based on analysis of said user interactions, calculating at least (A) a first fraud-score value associated with a first behavioral aspect reflected in said user interactions, and (B) a second fraud-score value associated with a second behavioral aspect reflected in said user interactions; calculating a weighted fraud-score value based on said first fraud-score value and said second fraud-score value; displaying, on the screen of said computer located remotely from said user, at least the weighted fraud-score value.

In some embodiments, the method comprises: based on analysis of user interactions, calculating at least (A) a first fraud-score value associated with a first behavioral aspect reflected in said user interactions, and (B) a second fraud-score value associated with a second behavioral aspect reflected in said user interactions; calculating a weighted fraud-score value based on said first and second fraud-score values; generating and displaying, on the screen of said computer located remotely from said user, an on-screen interface which comprises: (x) a first gauge indicating the first fraud-score value; (y) a second gauge indicating the second fraud-score value; (z) a third gauge indicating the weighted fraud-score value.

In some embodiments, the method may comprise: detecting and storing in a repository the Internet Protocol (IP) address of each usage session of said user with the computerized service; converting each IP address of each usage session of said user, into a geo-spatial location on Earth; displaying a graphical representation of a map of Earth; displaying on said map of Earth multiple representations of pins, wherein the number of pins displayed is equal to the number of usage sessions of said user with the computerized service; wherein each pin is displayed at a map location that corresponds to the geo-spatial location on Earth from which a corresponding usage session of said user has occurred.

In some embodiments, the method comprises: detecting and storing in a repository the Internet Protocol (IP) address of each usage session of said user with the computerized service; converting each IP address of each usage session of said user, into a geo-spatial location on Earth; displaying a graphical representation of a map of Earth; displaying on said map of Earth multiple representations of pins; wherein the number of pins displayed is smaller than the number of usage sessions of said user with the computerized service; wherein each pin is displayed at a map location that corresponds to the geo-spatial location on Earth from which at least one corresponding usage session of said user has occurred; wherein each pin further displays a numeric value that indicates the aggregate number of usage sessions of said user that occurred from multiple geo-spatial locations that are within a pre-defined radius around the map location to which said pin points.

In some embodiments, the method may comprise: detecting and storing in a repository the Internet Protocol (IP) address of each usage session of said user with the computerized service; converting each IP address of each usage session of said user, into an IP-based geo-spatial location on Earth; determining an actual geo-spatial location on Earth for each one of said usage sessions of said user, based on a combination of both: (A) said IP-based geo-spatial location, and (B) at least one more parameter selected from the group consisting of: a language in which said user interacts with the computerized service, a language in which a keyboard of said user is able to type, a language that said user selected for user interface of said computerized service; displaying a graphical representation of a map of Earth; displaying on said map of Earth multiple representations of pins; wherein the number of pins displayed is equal to the number of usage sessions of said user with the computerized service; wherein each pin is displayed at a map location that corresponds to the actual geo-spatial location on Earth from which a corresponding usage session of said user has occurred.

In some embodiments of the present invention, a method comprises: (a) monitoring at least computer-mouse interactions and keyboard interactions of a user, who utilizes a computer-mouse and a keyboard to interact with a computerized service during a usage session; (b) determining a mouse-usage value that indicates the number of times that the user utilized the computer-mouse to enter data and to make selections during said usage session; (c) determining a non-mouse usage value that indicates the number of times that the user utilized other, non-mouse, input units to enter data and to make selections during said usage session; (d) determining a current ratio between the mouse-usage value and the non-mouse usage value, during said usage session; (e) determining a past ratio between mouse-usage and non-mouse usage, during one or more previous usage sessions of said user; (f) generating an output that indicates both: (I) the current ratio between the mouse-usage value and the non-mouse usage value, during said usage session, and also (II) the past ratio between mouse-usage and non-mouse usage, during one or more previous usage sessions of said user.

In some embodiments, the method further comprises: (g) if the current ratio is different from the past ratio by at least a pre-defined threshold value of percent, then determining that said user is a potential cyber-attacker.

In some embodiments, the method further comprises: (g) if the current ratio is different from the past ratio by at least a pre-defined threshold value of percent, and also if a transaction performed during said usage session has a monetary value greater than a pre-defined threshold, then determining that said user is a potential cyber-attacker.

In some embodiments, a method comprises: (a) monitoring at least computer-mouse interactions and keyboard interactions of a user, who utilizes a computer-mouse and a keyboard to interact with a computerized service during a usage session; (b) determining a keyboard-usage value that indicates the number of times that the user utilized the keyboard to enter data and to make selections during said usage session; (c) determining a non-keyboard usage value that indicates the number of times that the user utilized other, non-keyboard, input units to enter data and to make selections during said usage session; (d) determining a current ratio between the keyboard-usage value and the non-keyboard usage value, during said usage session; (e) determining a past ratio between keyboard-usage and non-keyboard usage, during one or more previous usage sessions of said user; (f) generating an output that indicates both: (I) the current ratio between the keyboard-usage value and the non-keyboard usage value, during said usage session, and also (II) the past ratio between keyboard-usage and non-keyboard usage, during one or more previous usage sessions of said user.

In some embodiments, the method further comprises: (g) if the current ratio is different from the past ratio by at least a pre-defined threshold value of percent, then determining that said user is a potential cyber-attacker.

In some embodiments, the method further comprises: (g) if the current ratio is different from the past ratio by at least a pre-defined threshold value of percent, and also if a transaction performed during said usage session has a monetary value greater than a pre-defined threshold, then determining that said user is a potential cyber-attacker.

In some embodiments, a method comprises: (a) monitoring input-unit interactions of a user, who utilizes an electronic device to interact with a computerized service during a usage session; (b) determining a first input-unit usage value, that indicates the number of times that the user utilized a first input-unit of the electronic device to enter data and to make selections during said usage session; (c) determining a second input-unit usage value, that indicates the number of times that the user utilized a second input-unit of the electronic device to enter data and to make selections during said usage session; (d) determining a current ratio between the first input-unit usage value and the second input-unit usage value, during said usage session; (e) determining a past ratio between the first input-unit usage value and the second input-unit usage value, during one or more previous usage sessions of said user; (f) generating an output that indicates both: (I) the current ratio between the first input-unit usage value and the second input-unit usage value, during said usage session, and also (II) the past ratio between the first input-unit usage value and the second input-unit usage value, during one or more previous usage sessions of said user.

In some embodiments, the method further comprises: (g) if the current ratio is different from the past ratio by at least a pre-defined threshold value of percent, then determining that said user is a potential cyber-attacker.

In some embodiments, the method further comprises: (g) if the current ratio is different from the past ratio by at least a pre-defined threshold value of percent, and also if a transaction performed during said usage session has a monetary value greater than a pre-defined threshold, then determining that said user is a potential cyber-attacker.

In some embodiments, a method comprises: (a) monitoring input-unit interactions of a user, who utilizes an electronic device to interact with a computerized service during a usage session; (b) determining that in said usage session, in M percent of interactions the user utilized a touch-screen of the electronic device to enter data and to make selections; (c) determining that in one or more previous usage session of said user, in N percent of interactions the user utilized the touch-screen of the electronic device to enter data and to make selections; (d) determining that M is different from N by at least a pre-defined threshold of difference; (e) based at least on the determining of step (d), determining that said usage session is attributed to a cyber-attacker and not to a legitimate user.

In some embodiments, a method comprises: (a) monitoring input-unit interactions of a user, who utilizes an electronic device to interact with a computerized service during a usage session; (b) determining a session period that indicates a time length of said usage session; (c) determining an average past session period, that indicates an average length of multiple, past, usage sessions of said user; (d) determining that the session period is different from the average past session period, by at least a pre-defined threshold difference; (e) based at least on the determining of step (d), determining that said usage session is attributed to a cyber-attacker and not to a legitimate user.

In some embodiments, a process comprises: (a) monitoring a plurality of usage sessions in which a plurality of users have accessed a computerized service via a plurality of electronic devices; (b) for each usage session, generating a fraud-score that is associated with said usage session, and that is generated based on monitoring user interactions via an input-unit during said usage session; (c) defining a risky session threshold value, that corresponds to risky usage sessions, wherein a usage session that has a fraud-score value that is greater than or equal to said risky session threshold value is marked as a risky usage session; (d) filtering said plurality of usage sessions, to generate a filtered list that consists of risky usage sessions and that excludes non-risky usage sessions, based on said risky session threshold value; (e) determining an originating geographic location for each of said risky usage sessions; (f) generating a geographical map in which risky usage sessions, that originate from a common originating geographical location, are grouped together and are indicated on said geographical map by a single unified identifier.

In some embodiments, the method further comprises: step (d) comprises: filtering said plurality of usage sessions, to generate a filtered list that consists of risky usage sessions that occurred during a particular time-slot, and that excludes non-risky usage sessions, and that excludes usage sessions that occurred externally to said particular time-slot.

In some embodiments, a method comprises: (a) monitoring user interactions of a user, who utilizes a computing device to interact with a computerized service during a usage session; (b) for each particular type of data entry method that the user utilizes during said usage session: (b1) calculating a current number of occurrences of utilization of said particular type of data entry method during said usage session, and generating output corresponding to said current number of occurrences during said usage session; (b2) calculating a ratio between (A) said current number of occurrences of utilization of said particular type of data entry method during said usage session, and (B) an average number of occurrences of utilization of said particular type of data entry method during previous usage sessions of said user; and generating output corresponding to said ratio; (b3)

based on (i) said current number of occurrences, and (ii) said average number of occurrences during previous usage sessions of said user, determining whether said user is an authorized user or a cyber-attacker.

In some embodiments, the determining of step (b3) is performed by: (A) determining that in the current usage session of said user, K percent of interactions with a particular UI element are performed via a computer mouse; (B) determining that in previous usage sessions of said user, M percent of interactions with said particular UI element were performed via the computer mouse; (C) determining that K is different than M by at least N percent, wherein N is a pre-defined threshold number of percent-points; (D) based on step (C), determining that the current usage session is attributed to a cyber-attacker and not to the authorized user.

In some embodiments, the determining of step (b3) is performed by: (A) determining that in the current usage session of said user, K percent of interactions with a particular UI element are performed by a touch-pad; (B) determining that in previous usage sessions of said user, M percent of interactions with said particular UI element were performed via the touch-pad; (C) determining that K is different than M by at least N percent, wherein N is a pre-defined threshold number of percent-points; (D) based on the determining of step (C), determining that the current usage session is attributed to a cyber-attacker and not to the authorized user.

In some embodiments, determining of step (b3) is performed by: (A) determining that in the current usage session of said user, K percent of interactions with a particular user-interface element are performed by a keyboard; (B) determining that in previous usage sessions of said user, M percent of interactions with said particular user-interface element were performed via the keyboard; (C) determining that K is different than M by at least N percent, wherein N is a pre-defined threshold number of percent-points; (D) based on the determining of step (C), determining that the current usage session is attributed to a cyber-attacker and not to the authorized user.

In some embodiments, the determining of step (b3) is performed by: (A) determining that in the current usage session of said user, K percent of interactions with a particular user-interface element are performed by a touch-screen; (B) determining that in previous usage sessions of said user, M percent of interactions with said particular user-interface element were performed via the touch-screen; (C) determining that K is different than M by at least N percent-points, wherein N is a pre-defined threshold number of percent-points; (D) based on the determining of step (C), determining that the current usage session is attributed to a cyber-attacker and not to the authorized user.

In some embodiments, the determining of step (b3) is performed by: (A) determining that in the current usage session of said user, a majority of interactions with a particular user-interface element are performed via a keyboard; (B) determining that in previous usage sessions of said user, a majority of interactions with said particular user-interface element were performed via an input-unit other than the keyboard; (C) based on the cumulative determining operations of steps (A) and (B), determining that the current usage session is attributed to a cyber-attacker and not to the authorized user.

In some embodiments, the determining of step (b3) is performed by: (A) determining that in the current usage session of said user, a majority of interactions with a particular user-interface element are performed via a touch-screen; (B) determining that in previous usage sessions of said user, a majority of interactions with said particular user-interface element were performed via an input-unit other than the touch-screen; (C) based on the cumulative determining operations of steps (A) and (B), determining that the current usage session is attributed to a cyber-attacker and not to the authorized user.

In some embodiments, the determining of step (b3) is performed by: (A) determining that in the current usage session of said user, a majority of interactions with a particular user-interface element are performed via a computer mouse; (B) determining that in previous usage sessions of said user, a majority of interactions with said particular user-interface element were performed via an input-unit other than the computer mouse; (C) based on the cumulative determining operations of steps (A) and (B), determining that the current usage session is attributed to a cyber-attacker and not to the authorized user.

In some embodiments, the determining of step (b3) is performed by: (A) determining that in the current usage session of said user, a majority of interactions with a particular user-interface element are performed via a touch-pad; (B) determining that in previous usage sessions of said user, a majority of interactions with said particular user-interface element were performed via an input-unit other than the touch-pad; (C) based on the cumulative determining operations of steps (A) and (B), determining that the current usage session is attributed to a cyber-attacker and not to the authorized user.

In some embodiments, the determining of step (b3) is performed by: (A) defining a first data-entry method that users can utilize to engage with a particular UI element; (B) defining a second, different, data-entry method that users can utilize to engage with said particular user-interface element; (C) for a particular usage session of said user, which is being reviewed for possible fraud, comparing between: (I) a number of times that said user utilized the first data-entry method to engage with said particular UI element during said particular usage session being reviewed, and (II) a number of times that said user utilized the second data-entry method to engage with said particular UI element during said particular usage session being reviewed.

In some embodiments, the determining of step (b3) is performed by: (A) defining a first data-entry method that users can utilize to engage with a particular user-interface element; (B) defining a second, different, data-entry method that users can utilize to engage with said particular user-interface element; (C) for all previous usage session of said user with said computerized service, comparing between: (I) an aggregate number of times that said user utilized the first data-entry method to engage with said particular user-interface element during all previous usage sessions, and (II) an aggregate number of times that said user utilized the second data-entry method to engage with said particular user-interface element during all previous usage sessions.

In some embodiments, the method comprises: (c1) determining a computer-mouse fraud-score, associated with utilization of a computer-mouse during current usage session, indicating a level of similarity between: (I) current usage of the mouse to interact with the computerized service during the current usage session, and (II) historic usage of the mouse to interact with the computerized service during previous usage sessions of said user; (c2) if said mouse fraud-score is greater than a pre-defined fraud-score threshold value, then generating a notification that said user is estimated to be a cyber-attacker and not the authorized user.

In some embodiments, the method comprises: (c1) determining a touchpad fraud-score, associated with utilization of a computer mouse during current usage session, indicating a level of similarity between: (I) current usage of the touchpad to interact with the computerized service during the current usage session, and (II) historic usage of the touchpad to interact with the computerized service during previous usage sessions of said user; (c2) if said touchpad fraud-score is greater than a pre-defined fraud-score threshold value, then generating a notification that said user is estimated to be a cyber-attacker and not the authorized user.

In some embodiments, the method comprises: (c1) determining a touch-screen fraud-score, associated with utilization of a computer mouse during current usage session, indicating a level of similarity between: (I) current usage of the touch-screen to interact with the computerized service during the current usage session, and (II) historic usage of the touch-screen to interact with the computerized service during previous usage sessions of said user; (c2) if said touch-screen fraud-score is greater than a pre-defined fraud-score threshold value, then generating a notification that said user is estimated to be a cyber-attacker and not the authorized user.

In some embodiments, the method comprises: (c1) determining a keyboard fraud-score, associated with utilization of a computer mouse during current usage session, indicating a level of similarity between: (I) current usage of the keyboard to interact with the computerized service during the current usage session, and (II) historic usage of the keyboard to interact with the computerized service during previous usage sessions of said user; (c2) if said keyboard fraud-score is greater than a pre-defined fraud-score threshold value, then generating a notification that said user is estimated to be a cyber-attacker and not the authorized user.

In some embodiments, the method comprises: performing at least two (or at least three; or all) of the following steps (c1), (c2), (c3), (c4); the steps being: (c1) determining a keyboard fraud-score, associated with utilization of a computer mouse during current usage session, indicating a level of similarity between: (I) current usage of the keyboard to interact with the computerized service during the current usage session, and (II) historic usage of the keyboard to interact with the computerized service during previous usage sessions of said user; (c2) determining a touchpad fraud-score, associated with utilization of a computer mouse during current usage session, indicating a level of similarity between: (I) current usage of the touchpad to interact with the computerized service during the current usage session, and (II) historic usage of the touchpad to interact with the computerized service during previous usage sessions of said user; (c3) determining a computer-mouse fraud-score, associated with utilization of a computer mouse during current usage session, indicating a level of similarity between: (I) current usage of the computer-mouse to interact with the computerized service during the current usage session, and (II) historic usage of the computer-mouse to interact with the computerized service during previous usage sessions of said user; (c4) determining a touch-screen fraud-score, associated with utilization of a computer mouse during current usage session, indicating a level of similarity between: (I) current usage of the touch-screen to interact with the computerized service during the current usage session, and (II) historic usage of the touch-screen to interact with the computerized service during previous usage sessions of said user. Then, the method comprises: (d) generating a notification that said user is estimated to be a cyber-attacker and not the authorized user, wherein said generating is based cumulatively on at least two of: (d1) said keyboard fraud-score, (d2) said touchpad fraud-score, (d3) said computer-mouse fraud-score, (d4) said touch-screen fraud-score.

In some embodiments, the method comprises: (A) determining that a particular usage session of said user with said computerized service, had a particular time-period (T1); and (B) determining that all prior usage sessions of said user with said computerized service, on average, had an average time-period (T2); and (C) determining that T1 is different than T2 by at least N percent, wherein N is a pre-defined threshold number of percent-points; and (D) based on the determining of step (C), determining that the current usage session is attributed to a cyber-attacker and not to the authorized user.

In some embodiments, the method comprises: (A) determining that a particular usage session of said user with said computerized service, had a particular time-period (T1); and (B) determining that all prior usage sessions of said user with said computerized service, on average, had an average time-period (T2); and (C) determining that T1 is shorter than T2 by at least N percent, wherein N is a pre-defined threshold number of percent-points; and (D) based on the determining of step (C), determining that the current usage session is attributed to a cyber-attacker and not to the authorized user.

In some embodiments, the method comprises: (A) detecting that a particular usage session of said user with said computerized service, is shorter than an average session-length of all prior usage sessions of said user with said computerized service; (B) detecting that said particular usage session, originates from a geographical location that is different from the geographical location that originated a majority of all prior usage sessions of said user with said computerized service; (C) based cumulatively on the determining of steps (A) and (B), generating a notification that said particular usage session is attributed to a cyber-attacker and not to the authorized user.

In some embodiments, the method comprises: (A) detecting that a particular usage session of said user with said computerized service, is shorter than an average session-length of all prior usage sessions of said user with said computerized service; (B) detecting that said particular usage session, exhibits increased usage of a particular input-unit, relative to all prior usage sessions of said user with said computerized service; (C) based cumulatively on the determining of steps (A) and (B), generating a notification that said particular usage session is attributed to a cyber-attacker and not to the authorized user.

In some embodiments, the method comprises: (A) detecting that a particular usage session of said user with said computerized service, is shorter than an average session-length of all prior usage sessions of said user with said computerized service; (B) detecting that said particular usage session, exhibits reduced usage of a particular input-unit, relative to all prior usage sessions of said user with said computerized service; (C) based cumulatively on the determining of steps (A) and (B), generating a notification that said particular usage session is attributed to a cyber-attacker and not to the authorized user.

In some embodiments, step (b2) further comprises: determining also a user-to-population ratio between (A) said current number of occurrences of utilization of said particular type of data entry method during said usage session by said user, and (B) an average number of occurrences of utilization of said particular type of data entry method during previous usage sessions of a group of users; and generating output corresponding to said user-to-population ratio.

Optionally, the additional ratio of user-to-population may relate to a particular behavioral features or user-specific characteristic, that may be extracted from monitoring of user interactions; such that the visualization console may determine and may generate as output, for example: (a) number of occurrences of this user-specific feature in the currently-investigated/currently-reviewed usage session of this particular user; and (b) number of occurrences of this user-specific feature in the past/historic usage sessions of this particular user (e.g., in all his past usage sessions; or in his most recent N usage sessions; or in his most-recent usage sessions that occurred in the past T days); and (c) number of occurrences of this user-specific feature in the usage sessions of the entire population of users, or in a sufficiently-large group of users (e.g., at least 100 or at least 1000 users, or at least K users based on a pre-defined threshold value). Accordingly, the system may determine or estimate, how frequent or how rare is the user-specific behavioral feature that was exhibited in the usage session under review; how rare or frequent it is relative to this particular usage session itself (e.g., determining that the user has exhibited this user-specific behavioral feature 95 percent of the times that that the user engaged with the computer-mouse in the investigated user session); how rare or frequent it is relative to past usage sessions of this particular user; and/or how rare or frequent it is relative to past usage sessions of an entire population or a large group of users.

In some embodiments, the monitoring and/or the analysis may relate to, or may be applied to, or may be performed with relation to: the on-screen pointer, and/or the on-screen cursor, and/or user gestures, and/or user movements of a pointing device, and/or user engagement with an input unit (e.g., clicking, dragging, typing), and/or user interactions with a touch-pad or touch-screen or multi-touch-screen (e.g., swiping, finger dragging, tapping, zoom-in gesture, zoom-out gesture), and/or user interactions with an entirety of a mobile electronic device (e.g., tilting or slanting or flipping the entire smartphone or the entire tablet; rotating or spinning the smartphone or tablet), and/or other suitable types of interactions, movements, gestures, and/or other user-originating operations or actions.

Embodiments of the present invention may be utilized with a variety of devices or systems having a touch-screen or a touch-sensitive surface; for example, a smartphone, a cellular phone, a mobile phone, a smart-watch, a tablet, a handheld device, a portable electronic device, a portable gaming device, a portable audio/video player, an Augmented Reality (AR) device or headset or gear, a Virtual Reality (VR) device or headset or gear, a "kiosk" type device, a vending machine, an Automatic Teller Machine (ATM), a laptop computer, a desktop computer, a vehicular computer, a vehicular dashboard, a vehicular touch-screen, or the like.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) and/or device(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), acoustic microphone(s) and/or sensor(s), optical microphone(s) and/or sensor(s), laser or laser-based microphone(s) and/or sensor(s), wired or wireless modems or transceivers or transmitters or receivers, GPS receiver or GPS element or other location-based or location-determining unit or system, network elements (e.g., routers, switches, hubs, antennas), and/or other suitable components and/or modules.

The system(s) and/or devices of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Some embodiments may be implemented by using a special-purpose machine or a specific-purpose device that is not a generic computer, or by using a non-generic computer or a non-general computer or machine. Such system or device may utilize or may comprise one or more components or units or modules that are not part of a "generic computer" and that are not part of a "general purpose computer", for example, cellular transceivers, cellular transmitter, cellular receiver, GPS unit, location-determining unit, accelerometer(s), gyroscope(s), device-orientation detectors or sensors, device-positioning detectors or sensors, or the like.

Some embodiments may be implemented as, or by utilizing, an automated method or automated process, or a machine-implemented method or process, or as a semi-automated or partially-automated method or process, or as a set of steps or operations which may be executed or performed by a computer or machine or system or other device.

Some embodiments may be implemented by using code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL, BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process (es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

Some embodiments may perform operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a list of reference value(s) or a database of reference values or ranges; a comparison or matching or searching process which searches for matches and/or identical results and/or similar results and/or sufficiently-close results, among multiple values or limits that are stored in a database or look-up table; utilization of equations, formula, weighted formula, and/or other calculation to determine similarity or a match between or among parameters or values; utilization of comparator units, lookup tables, threshold values, conditions, conditioning logic, Boolean operator(s) and/or other suitable components and/or operations.

The terms "plurality" and "a plurality", as used herein, include, for example, "multiple" or "two or more". For example, "a plurality of items" includes two or more items.

References to "one embodiment", "an embodiment", "demonstrative embodiment", "demonstrative embodiments", "various embodiments", "some embodiments", or similar terms, may indicate that the embodiment(s) so described may optionally include a particular feature, structure, or characteristic, but not every embodiment necessarily includes the particular feature, structure, or characteristic. Repeated use of the phrase "in one embodiment" does not necessarily refer to the same embodiment, although it may. Repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Some embodiments may comprise, or may be implemented by using, an "app" or application which may be downloaded or obtained from an "app store" or "applications store", for free or for a fee, or which may be pre-installed on a computing device or electronic device, or which may be transported to and/or installed on such computing device or electronic device.

Functions, operations, components and/or features described herein with reference to one or more embodiments of the present invention, may be combined with, or may be utilized in combination with, one or more other functions, operations, components and/or features described herein with reference to one or more other embodiments of the present invention.

Modules, elements, systems and/or sub-systems described herein may be implemented by using hardware components and/or software modules; for example, utilizing a processor, a controller, an Integrated Circuit (IC), a logic unit, memory unit, storage unit, input unit, output unit, wireless modem or transceiver, wired modem or transceiver, internal or external power source, database or data repository, Operating System (OS), drivers, software applications, or the like. Some embodiments may utilize client/server architecture, distributed architecture, peer-to-peer architecture, and/or other suitable architectures; as well as one or more wired and/or wireless communication protocols, links and/or networks.

Although portions of the discussion herein relate, for demonstrative purposes, to wired links and/or wired communications, some embodiments of the present invention are not limited in this regard, and may include one or more wired or wireless links, may utilize one or more components of wireless communication, may utilize one or more methods or protocols of wireless communication, or the like. Some embodiments may utilize wired communication and/or wireless communication.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

The invention claimed is:

1. A method comprising:
   (a) monitoring user interactions of a user, who utilizes a computing device to interact with a computerized service during a usage session;
   (b) for each particular type of data entry method that the user utilizes during said usage session:
   (b1) determining a current number of occurrences of utilization of said particular type of data entry method during said usage session, and generating output corresponding to said current number of occurrences during said usage session;
   (b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;
   (b3) based on (i) said current number of occurrences, and (ii) said average number of occurrences during previous usage sessions of said user, determining whether said user is an authorized user or a cyber-attacker;

wherein the determining of step (b3) is performed by:

(A) determining that in the current usage session of said user, K percent of interactions with a particular user-interface element are performed via a computer mouse;

(B) determining that in previous usage sessions of said user, M percent of interactions with said particular user-interface element were performed via the computer mouse;

(C) determining that K is different than M by at least N percent, wherein N is a pre-defined threshold number of percent-points;

(D) based on the determining of step (C), determining that the current usage session is attributed to a cyber-attacker and not to the authorized user.

2. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) determining that in the current usage session of said user, K percent of interactions with a particular user-interface element are performed by a touch-pad;

(B) determining that in previous usage sessions of said user, M percent of interactions with said particular user-interface element were performed via the touch-pad;

(C) determining that K is different than M by at least N percent, wherein N is a pre-defined threshold number of percent-points;

(D) based on the determining of step (C), determining that the current usage session is attributed to a cyber-attacker and not to the authorized user.

3. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) determining that in the current usage session of said user, K percent of interactions with a particular user-interface element are performed by a keyboard;

(B) determining that in previous usage sessions of said user, M percent of interactions with said particular user-interface element were performed via the keyboard;

(C) determining that K is different than M by at least N percent, wherein N is a pre-defined threshold number of percent-points;

(D) based on the determining of step (C), determining that the current usage session is attributed to a cyber-attacker and not to the authorized user.

4. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) determining that in the current usage session of said user, K percent of interactions with a particular user-interface element are performed by a touch-screen;

(B) determining that in previous usage sessions of said user, M percent of interactions with said particular user-interface element were performed via the touch-screen;

(C) determining that K is different than M by at least N percent-points, wherein N is a pre-defined threshold number of percent-points;

(D) based on the determining of step (C), determining that the current usage session is attributed to a cyber-attacker and not to the authorized user.

5. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) determining that in the current usage session of said user, a majority of interactions with a particular user-interface element are performed via a keyboard;

(B) determining that in previous usage sessions of said user, a majority of interactions with said particular user-interface element were performed via an input-unit other than the keyboard;

(C) based on the cumulative determining operations of steps (A) and (B), determining that the current usage session is attributed to a cyber-attacker and not to the authorized user.

6. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) determining that in the current usage session of said user, a majority of interactions with a particular user-interface element are performed via a touch-screen;

(B) determining that in previous usage sessions of said user, a majority of interactions with said particular user-interface element were performed via an input-unit other than the touch-screen;

(C) based on the cumulative determining operations of steps (A) and (B), determining that the current usage session is attributed to a cyber-attacker and not to the authorized user.

7. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) determining that in the current usage session of said user, a majority of interactions with a particular user-interface element are performed via a computer mouse;

(B) determining that in previous usage sessions of said user, a majority of interactions with said particular user-interface element were performed via an input-unit other than the computer mouse;

(C) based on the cumulative determining operations of steps (A) and (B), determining that the current usage session is attributed to a cyber-attacker and not to the authorized user.

8. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) determining that in the current usage session of said user, a majority of interactions with a particular user-interface element are performed via a touch-pad;

(B) determining that in previous usage sessions of said user, a majority of interactions with said particular user-interface element were performed via an input-unit other than the touch-pad;

(C) based on the cumulative determining operations of steps (A) and (B), determining that the current usage session is attributed to a cyber-attacker and not to the authorized user.

9. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) defining a first data-entry method that users can utilize to engage with a particular user-interface element;

(B) defining a second, different, data-entry method that users can utilize to engage with said particular user-interface element;

(C) for a particular usage session of said user, which is being reviewed for possible fraud, comparing between: (I) a number of times that said user utilized the first data-entry method to engage with said particular user-interface element during said particular usage session being reviewed, and (II) a number of times that said user utilized the second data-entry method to engage with said particular user-interface element during said particular usage session being reviewed.

10. The method of claim 9, wherein step (b2) further comprises:

determining also a user-to-population ratio between (A) said current number of occurrences of utilization of said particular type of data entry method during said usage session by said user, and (B) an average number of occurrences of utilization of said particular type of data entry method during previous usage sessions of a group of users; and generating output corresponding to said user-to-population ratio.

11. A method comprising:

(a) monitoring user interactions of a user, who utilizes a computing device to interact with a computerized service during a usage session;

(b) for each particular type of data entry method that the user utilizes during said usage session:

(b1) determining a current number of occurrences of utilization of said particular type of data entry method during said usage session, and generating output corresponding to said current number of occurrences during said usage session;

(b2) determining a ratio between (A) said current number of occurrences of utilization of said particular type of data entry method during said usage session, and (B) an average number of occurrences of utilization of said particular type of data entry method during previous usage sessions of said user; and generating output corresponding to said ratio;

(b3) based on (i) said current number of occurrences, and (ii) said average number of occurrences during previous usage sessions of said user, determining whether said user is an authorized user or a cyber-attacker;

wherein the determining of step (b3) is performed by:

(A) defining a first data-entry method that users can utilize to engage with a particular user-interface element;

(B) defining a second, different, data-entry method that users can utilize to engage with said particular user-interface element;

(C) for all previous usage session of said user with said computerized service, comparing between: (I) an aggregate number of times that said user utilized the first data-entry method to engage with said particular user-interface element during all previous usage sessions, and (II) an aggregate number of times that said user utilized the second data-entry method to engage with said particular user-interface element during all previous usage sessions.

* * * * *